(12) United States Patent
Yoo et al.

(10) Patent No.: US 10,129,770 B2
(45) Date of Patent: Nov. 13, 2018

(54) REFERENCE SIGNAL TRANSMISSION IN WIRELESS COMMUNICATIONS WITH MULTIPLE RECEIVERS

(71) Applicant: QUALCOMM Incorporated, San Diego, CA (US)

(72) Inventors: Taesang Yoo, Riverside, CA (US); Dinkar Vasudevan, New Delhi (IN); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/453,736

(22) Filed: Mar. 8, 2017

(65) Prior Publication Data

US 2017/0295504 A1    Oct. 12, 2017

Related U.S. Application Data

(60) Provisional application No. 62/319,137, filed on Apr. 6, 2016.

(51) Int. Cl.
*H04W 24/02* (2009.01)
*H04L 1/00* (2006.01)
(Continued)

(52) U.S. Cl.
CPC .............. *H04W 24/02* (2013.01); *H04L 1/001* (2013.01); *H04L 5/005* (2013.01); *H04L 5/0048* (2013.01); *H04W 72/042* (2013.01); *H04W 72/14* (2013.01)

(58) Field of Classification Search
CPC ........ H04L 1/001; H04L 5/005; H04W 24/02; H04W 72/042; H04W 72/14
See application file for complete search history.

(56) References Cited

U.S. PATENT DOCUMENTS

| 2010/0232384 A1* | 9/2010 | Farajidana | H04L 5/005 370/329 |
| 2011/0111781 A1* | 5/2011 | Chen | H04B 7/02 455/507 |

(Continued)

FOREIGN PATENT DOCUMENTS

| WO | WO-2010105229 A1 | 9/2010 |
| WO | WO-2011057257 A1 | 5/2011 |
| WO | WO-2014107136 A1 | 7/2014 |

OTHER PUBLICATIONS

ISA/EP, International Search Report and Written Opinion of the International Searching Authority, Int'l Application No. PCT/US2017/021533, Jun. 2, 2017, European Patent Office, Rijswijk, NL, 14 pgs.

*Primary Examiner* — Kasif Siddiqui
(74) *Attorney, Agent, or Firm* — Nerrie M. Zohn

(57) ABSTRACT

Methods, systems, and devices for broadcast transmissions in wireless communication are described. A base station may transmit a control reference signal (CRS), a UE-specific reference signal (UERS), and broadcast data (e.g., broadcast physical downlink shared channel (PDSCH) data) in a broadcast downlink transmission. A UE may identify that the CRS and UERS are associated with the broadcast downlink data, and demodulate the broadcast downlink data in the broadcast downlink transmission based at least in part on the CRS and UERS. A UE may estimate a frequency offset based on a phase difference between the CRS and UERS, combine the CRS and UERS for use in a channel estimation, and demodulate the broadcast data based at least in part on the estimated frequency offset and channel estimation. The base station may provide signaling, such as dynamic or semi-static signaling, that indicates presence of both CRS and UERS.

28 Claims, 17 Drawing Sheets

(51) Int. Cl.
   *H04L 5/00* (2006.01)
   *H04W 72/04* (2009.01)
   *H04W 72/14* (2009.01)

(56) References Cited

U.S. PATENT DOCUMENTS

| | | | | |
|---|---|---|---|---|
| 2015/0003316 A1* | 1/2015 | Kim | .................... | H04L 5/0055 370/312 |
| 2015/0341153 A1* | 11/2015 | Jongren | ................ | H04L 5/0051 370/329 |
| 2016/0105264 A1* | 4/2016 | Chen | .................... | H04W 4/70 370/329 |

* cited by examiner

REFERENCE SIGNAL TRANSMISSION IN WIRELESS COMMUNICATIONS WITH MULTIPLE RECEIVERS

CROSS REFERENCES

The present application for patent claims priority to U.S. Provisional Patent Application No. 62/319,137 by Yoo, et al., entitled "Reference signal Transmission in Wireless Communications With Multiple Receivers," filed Apr. 6, 2016, assigned to the assignee hereof, and is hereby expressly incorporated by reference herein in its entirety.

BACKGROUND

The following relates generally to wireless communication, and more specifically to reference signal transmission in wireless communications with multiple receivers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

Wireless communications may be supported with control signals and reference signals (such as a control reference signal (CRS)). In some cases, a base station may transmit a reference signal that a receiver, such as a UE, may use to demodulate an associated DL transmission. In some cases, a relatively small amount of reference signaling may be provided, and a receiver operating in conditions where received signals may be relatively weak, such as a UE operating at an edge of a coverage area of a base station, may not be able to successfully demodulate and decode a DL transmission based on the relatively small amount of reference signaling. This may result in delays due to reduced throughput to a UE.

SUMMARY

The present disclosure provides techniques for enhanced downlink (DL) transmissions that are broadcast to multiple user equipment (UE) devices. A base station may transmit a DL grant, a reference signal used for control demodulation (e.g., a control reference signal (CRS), a common reference signal (CRS), a cell-specific reference signal (CRS), a demodulation reference signal (DMRS), a control channel (e.g., physical downlink control channel (PDCCH))), a reference signal used for data demodulation (e.g., a UE-specific reference signal (UERS), a DMRS, etc.), and broadcast data (e.g., broadcast physical downlink shared channel (PDSCH) data) in a broadcast DL transmission. In some cases, the control channel may indicate the broadcast data within the broadcast DL transmission. A UE may identify that the reference signal for control demodulation (e.g., the CRS) and the reference signal used for data demodulation (e.g., the UERS) are associated with the broadcast data, and demodulate the broadcast data in the broadcast DL transmission based at least in part on the CRS and UERS. A UE may, in some examples, estimate a frequency offset based on a phase difference between the CRS and UERS, combine the CRS and UERS for use in a channel estimation, and demodulate the broadcast data based at least in part on the estimated frequency offset and channel estimation. The base station may provide signaling, such as dynamic or semi-static signaling, that indicates that both CRS and UERS are present and associated with the broadcast data. In some examples, the base station may apply no precoding, or apply a same precoding, to the CRS and UERS.

A method of wireless communication is described. The method may include receiving, at a UE, a DL transmission from a base station, wherein the DL transmission is broadcast to a plurality of UEs and has a DL grant, a CRS associated with the DL grant, broadcast data, and a UERS associated with the broadcast data, identifying that the CRS and UERS are associated with the broadcast data and demodulating the broadcast data based at least in part on the CRS and UERS.

An apparatus for wireless communication is described. The apparatus may include means for receiving, at a UE, a DL transmission from a base station, wherein the DL transmission is broadcast to a plurality of UEs and has a DL grant, a CRS associated with the DL grant, broadcast data, and a UERS associated with the broadcast data, means for identifying that the CRS and UERS are associated with the broadcast data and means for demodulating the broadcast data based at least in part on the CRS and UERS.

A further apparatus is described. The apparatus may include a processor, memory in electronic communication with the processor, and instructions stored in the memory. The instructions may be operable to cause the processor to receive, at a UE, a DL transmission from a base station, wherein the DL transmission is broadcast to a plurality of UEs and has a DL grant, a CRS associated with the DL grant, broadcast data, and a UERS associated with the broadcast data, identify that the CRS and UERS are associated with the broadcast data and demodulate the broadcast data based at least in part on the CRS and UERS.

A non-transitory computer readable medium for wireless communication is described. The non-transitory computer-readable medium may include instructions to cause a processor to receive, at a UE, a DL transmission from a base station, where the DL transmission is broadcast to a set of UEs and has a DL grant, a CRS associated with the DL grant, broadcast data, and a UERS associated with the broadcast data, identify that the CRS and UERS are associated with the broadcast data and demodulate the broadcast data based on the CRS and UERS.

In some examples of the method, apparatus, or non-transitory computer-readable medium described above, identifying that the CRS and UERS are associated with the broadcast data comprises: identifying that the CRS is associated with the broadcast data. Some examples of the method, apparatus, or non-transitory computer-readable medium described above may further include processes, features, means, or instructions for identifying that the UERS is present and is associated with the broadcast data. In some examples of the method, apparatus, or non-transitory computer-readable medium described above, the demodulating the broadcast data is further based on an assumption that a same precoding is used for transmission of the CRS and UERS.

In some examples of the method, apparatus, or non-transitory computer-readable medium described above, demodulating the broadcast data comprises: estimating a frequency offset based on a phase difference between the CRS and UERS. Some examples of the method, apparatus, or non-transitory computer-readable medium described above may further include processes, features, means, or instructions for demodulating the broadcast data based on the estimated frequency offset.

In some examples of the method, apparatus, or non-transitory computer-readable medium described above, demodulating the broadcast data further comprises: combining the CRS and UERS for use in a channel estimation. Some examples of the method, apparatus, or non-transitory computer-readable medium described above may further include processes, features, means, or instructions for demodulating the broadcast data based on the channel estimation.

In some examples of the method, apparatus, or non-transitory computer-readable medium described above, a one or more antenna port of the UERS is mapped to a corresponding one or more antenna port of the CRS. In some examples of the method, apparatus, or non-transitory computer-readable medium described above, identifying that the CRS and UERS are associated with the broadcast data comprises: identifying a transmission type of the DL transmission is associated with both CRS and UERS.

In some examples of the method, apparatus, or non-transitory computer-readable medium described above, identifying that the CRS and UERS are associated with the broadcast data comprises: receiving signaling that indicates that both CRS and UERS are present and associated with the broadcast data. In some examples of the method, apparatus, or non-transitory computer-readable medium described above, the signaling is semi-static signaling that applies to certain types of broadcast data that are transmitted to the set of UEs.

In some examples of the method, apparatus, or non-transitory computer-readable medium described above, a type of broadcast data is provided in the DL grant associated with the broadcast data. In some examples of the method, apparatus, or non-transitory computer-readable medium described above, the signaling is dynamic signaling that applies to the broadcast data. In some examples of the method, apparatus, or non-transitory computer-readable medium described above, the dynamic signaling is provided in a DL grant associated with the broadcast data.

A method of wireless communication is described. The method may include identifying a plurality of receivers that are to receive a broadcast DL transmission, formatting a CRS, a UERS, and broadcast data in the broadcast DL transmission and transmitting the broadcast DL transmission to the plurality of receivers.

An apparatus for wireless communication is described. The apparatus may include means for identifying a plurality of receivers that are to receive a broadcast DL transmission, means for formatting a CRS, a DL grant, a UERS, and broadcast data in the broadcast DL transmission and means for transmitting the broadcast DL transmission to the plurality of receivers.

A further apparatus is described. The apparatus may include a processor, memory in electronic communication with the processor, and instructions stored in the memory. The instructions may be operable to cause the processor to identify a plurality of receivers that are to receive a broadcast DL transmission, format a CRS, a DL grant, a UERS, and broadcast data in the broadcast DL transmission and transmit the broadcast DL transmission to the plurality of receivers.

A non-transitory computer readable medium for wireless communication is described. The non-transitory computer-readable medium may include instructions to cause a processor to identify a set of receivers that are to receive a broadcast DL transmission, format a CRS, a DL grant, a UERS, and broadcast data in the broadcast DL transmission and transmit the broadcast DL transmission to the set of receivers.

In some examples of the method, apparatus, or non-transitory computer-readable medium described above, formatting the CRS, DL grant, UERS, and broadcast data for transmission in the broadcast DL transmission comprises: applying a same precoding to the CRS and UERS.

In some examples of the method, apparatus, or non-transitory computer-readable medium described above, transmitting the broadcast DL transmission comprises: transmitting the CRS using a first set of antenna ports. Some examples of the method, apparatus, or non-transitory computer-readable medium described above may further include processes, features, means, or instructions for transmitting the UERS using a second set of antenna ports that are one-to-one mapped to the first set of antenna ports.

Some examples of the method, apparatus, or non-transitory computer-readable medium described above may further include processes, features, means, or instructions for transmitting signaling indicating that both the CRS and the UERS are associated with the broadcast data.

In some examples of the method, apparatus, or non-transitory computer-readable medium described above, the signaling is semi-static signaling that applies to a set of broadcast data. In some examples of the method, apparatus, or non-transitory computer-readable medium described above, the signaling is dynamic signaling that applies to one set of broadcast data.

In some examples of the method, apparatus, or non-transitory computer-readable medium described above, transmitting signaling indicating that both the CRS and the UERS are associated with the broadcast data comprises: transmitting a DL grant allocating DL resources for the broadcast data. Some examples of the method, apparatus, or non-transitory computer-readable medium described above may further include processes, features, means, or instructions for setting a UERS indicator bit within DCI provided in the DL grant.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
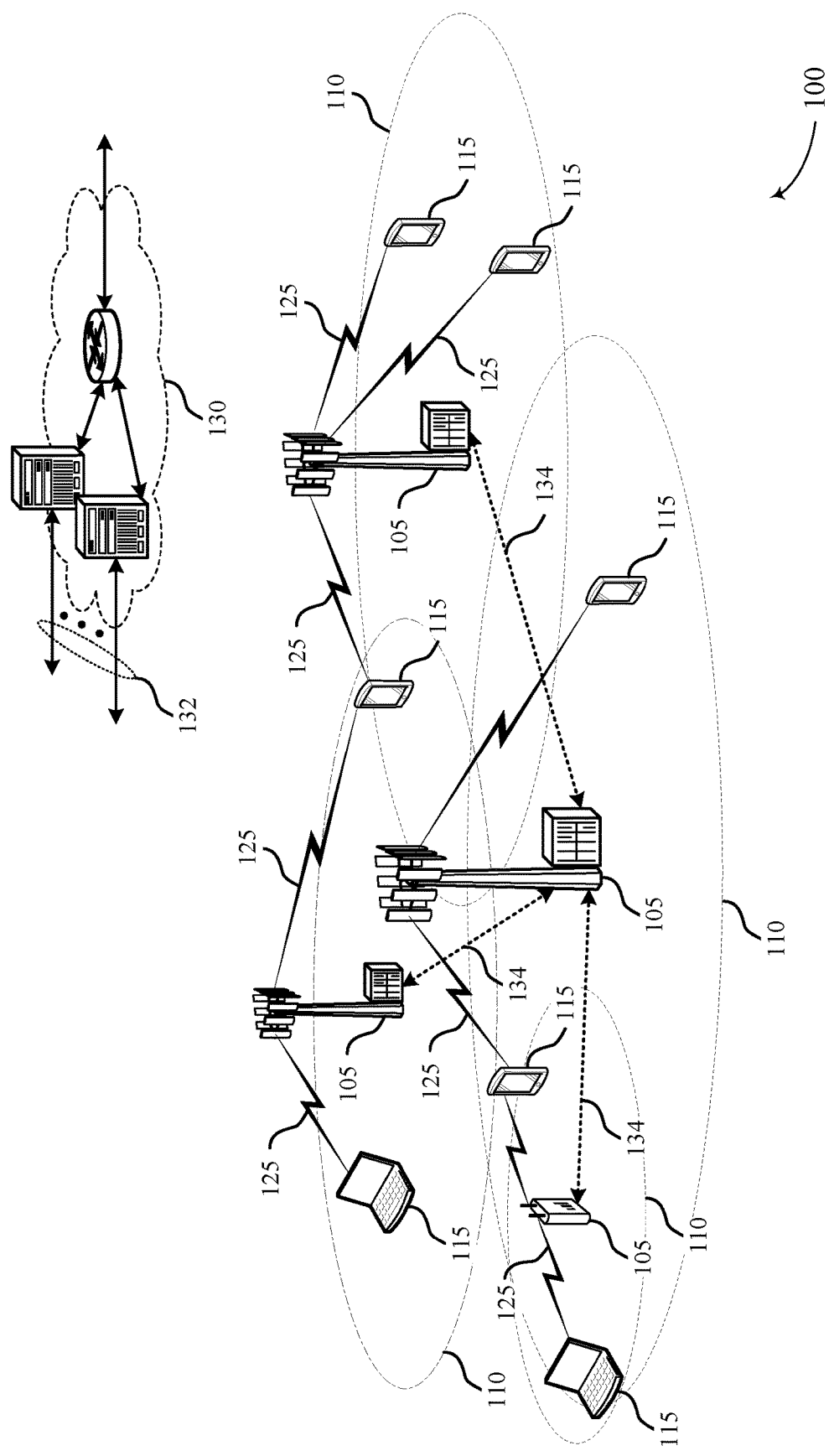
FIG. 1 illustrates an example of a wireless communications system that supports reference signal transmission in wireless communications with multiple receivers in accordance with aspects of the present disclosure.

The present disclosure provides techniques for enhanced downlink (DL) transmissions that are broadcast to multiple user equipment (UE) devices. As indicated above, in some scenarios a UE having relatively poor channel conditions, such as a UE at the edge of a coverage area of a base station, may encounter difficulty in successfully demodulating and decoding DL transmissions based on a cell-specific reference signal alone. Such UEs may have reduced performance due to missing certain DL transmissions, which may degrade the overall system efficiency and result in a reduced performance at the UE. Various aspects of the present disclosure may provide additional reference signals in such DL transmission to enhance the likelihood that a UE will successfully receive and decode such DL transmissions, thereby enhancing system efficiency and improving UE performance.

In some examples, a base station may transmit a reference signal used for control demodulation (e.g., a control reference signal (CRS), a cell-specific reference signal, a demodulation reference signal (DMRS), a control channel indicating broadcast data (e.g., physical downlink control channel (PDCCH), etc.), a reference signal used for data demodulation (e.g., a UE-specific reference signal (UERS), a DMRS, etc.), and broadcast data (e.g., broadcast physical downlink shared channel (PDSCH) data) in a broadcast DL transmission. A UE may identify that the reference signal for control demodulation (e.g., the CRS) and the reference signal used for data demodulation (e.g., the UERS) are associated with the broadcast data, and demodulate the broadcast data in the broadcast DL transmission based at least in part on the CRS and UERS. A UE may, in some examples, estimate a frequency offset based on a phase difference between the CRS and UERS, combine the CRS and UERS for use in a channel estimation, and demodulate the broadcast data based at least in part on the estimated frequency offset and channel estimation. The base station may provide signaling, such as dynamic or semi-static signaling, that indicates that both CRS and UERS are present in a broadcast DL transmission. In some examples, the base station may apply no precoding, or apply a same precoding, to the CRS and UERS.

As indicated above, such techniques may enhance the operation and system efficiency of a wireless communications system. For example, a base station may transmit broadcast PDSCH, which may include system information (e.g., in a system information block (SIB)) and paging data. Existing techniques may provide a cell-specific reference signal that is associated with the broadcast PDSCH that may be used by a UE for demodulation of the broadcast PDSCH. In some scenarios, retransmission techniques (e.g., hybrid automatic repeat request (HARQ) techniques) may not be available or desirable. For example, in a deployment using a shared radio frequency spectrum band it may be desirable to deliver broadcast PDSCH in a single shot without relying on HARQ retransmissions. In other examples, for a UE that is operating with relatively poor channel conditions, such as a UE at an edge of a coverage area, broadcast PDSCH transmissions, such as SIB and paging transmissions, need to reach the cell edge UEs (or other UEs having relatively poor channel conditions) without relying on HARQ retransmissions, which may result in a relatively low target operating point (e.g., decoding at −6 dB with block error rate <1%). At such an operating point, channel estimation loss from cell-specific reference signals alone may be relatively large. Additionally, a UE may not have a good frequency offset estimate based on a cell-specific reference signal alone, because a frequency tracking loop (FTL) at the UE may not have yet converged at the time of the broadcast PDSCH reception (e.g., due to the UE not running the FTL during discontinuous reception (DRX) prior to the broadcast DL transmission). Through the addition of additional reference signals in such broadcast DL transmissions, such as through both CRS and UERS transmissions, a UE may enhance channel estimation and frequency offset estimation and thereby have a higher likelihood of successfully receiving and decoding the broadcast PDSCH transmission.

Similarly, some techniques may provide a UERS that is associated with the broadcast PDSCH, which may be used by a UE for demodulation of the broadcast PDSCH. Additional reference signals may be included in such broadcast DL transmissions in CRS transmissions and UERS transmissions. The addition of the reference signals may enhance channel estimation and frequency offset estimation, and may increase the likelihood of successfully receiving and decoding the broadcast PDSCH transmission.

Aspects of the disclosure are initially described in the context of a wireless communication system. Broadcast DL transmission schemes that provide both CRS and UERS for use in demodulating data are discussed, in addition to examples of different CRS and UERS transmission and reception scenarios. Aspects of the disclosure are further illustrated by and described with reference to apparatus diagrams, diagrams, and flowcharts that relate to reference signal transmission in wireless communications with multiple receivers.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support transmitting broadcast data having multiple associated reference signals for improved demodulation at UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

As indicated above, a base station 105 may insert periodic pilot symbols such as cell-specific reference signal to aid UEs 115 in channel estimation and coherent demodulation. In some wireless systems, a cell-specific reference signal may include one of 504 different cell identities. They may be modulated using quadrature phase shift keying (QPSK) and power boosted (e.g., transmitted at 6 dB higher than the surrounding data elements) to make them resilient to noise and interference. A cell-specific reference signal may be embedded in 4 to 16 resource element (RE)s in each resource block (RB) based on the number of antenna ports or layers (up to 4) of the receiving UEs 115. In addition to cell-specific reference signal, which may be utilized by all UEs 115 in the geographic coverage area 110 of the base station 105, UERS may be directed toward specific UEs 115 and may be transmitted on RBs assigned to those UEs 115, according to some existing deployments. In various aspects of the present disclosure, UERS may be used with broadcast data to help improve demodulation at UEs 115 for some broadcast data. In some cases, additional reference signals known as channel state information (CSI) reference signals (CSI-RS) may be included to aid in generating CSI. On the UL, a UE 115 may transmit a combination of periodic sounding reference signal (SRS) and UL demodulation reference signal (DMRS) for link adaptation and demodulation, respectively.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that do are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration may be associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 μs). A TTI in eCC may include one or multiple symbols. In some cases, the TTI duration (i.e., the number of symbols in a TTI) may be variable.

In some cases, a UE 115 or base station 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

Some eCC deployments may define resources for CRS, UERS, control region, and PDSCH. For example, CRS may be transmitted on the first one or two symbols of a TTI. CRS may be followed by a control region having one or more symbols. After control region, UERS, if configured, may be transmitted on one or more symbols. The presence or absence of UERS may be indicated in a DL grant transmitted inside the control region, in some deployments. Following the control region and the optional UERS, PDSCH may transmitted on one or more symbols.

In some examples, base station 105 may identify data that is to be transmitted in a broadcast DL transmission, such as a broadcast PDSCH transmission. Such broadcast data may include, for example, SIB data or paging data, that is to be transmitted in a broadcast PDSCH transmission. In order to enhance demodulation of the broadcast data at UEs 115, a base station 105 may transmit a CRS, a UERS, and the broadcast PDSCH transmission in a broadcast DL transmission. A UE 115 may identify that the CRS and UERS are associated with the broadcast data, and demodulate the broadcast DL data in the broadcast DL transmission based at least in part on the CRS and UERS. A UE 115 may, in some examples, estimate a frequency offset based on a phase difference between the CRS and UERS, combine the CRS and UERS for use in a channel estimation, and demodulate the broadcast data based at least in part on the estimated frequency offset and channel estimation. The base station 105 may provide signaling, such as dynamic or semi-static signaling, that indicates that both CRS and UERS are present in a broadcast DL transmission. In some examples, the base station 105 may apply no precoding, or apply a same precoding, to the CRS, UERS, and broadcast data.

Figure 2:
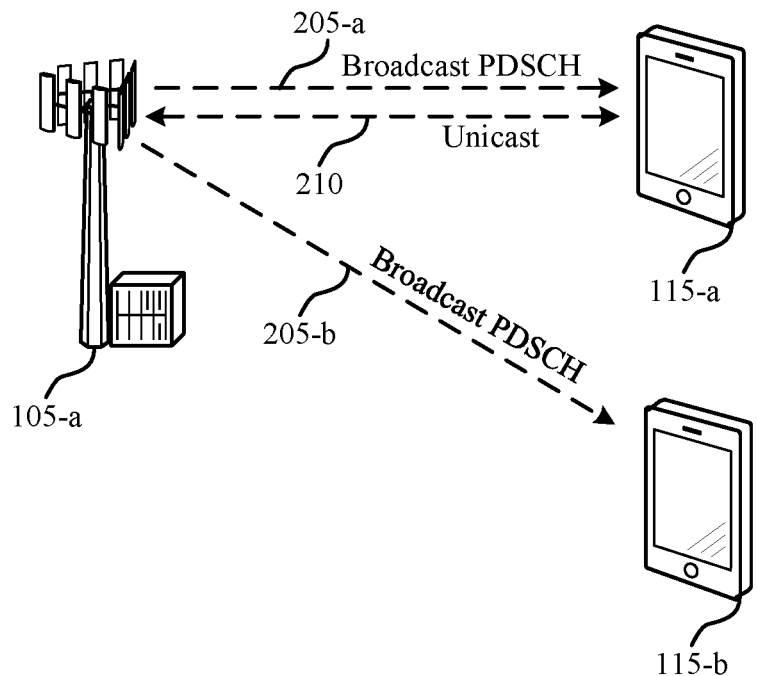
FIG. 2 illustrates an example of a wireless communications system that supports reference signal transmission in wireless communications with multiple receivers in accordance with aspects of the present disclosure.

FIG. 2 illustrates an example of a wireless communications system 200 for reference signal transmission in wireless communications with multiple receivers. Wireless communications system 200 may include base station 105-a, a first UE 115-a and a second UE 115-b, which may be examples of the corresponding devices described with reference to FIG. 1. Base station 105-a may transmit broadcast DL transmissions to both UEs 115-a and 115-b (and one or more other UEs 115 if present) via broadcast communication links 205-a and 205-b. Base station 105-a may establish bidirectional unicast communications with first UE 115-a via broadcast communication link 210. As indicated above, broadcast communication links 205-a and 205-b may be used to transmit broadcast DL transmissions that may include broadcast data. The DL transmission may include a first reference signal associated with control information. In some examples, the first reference signal may be a CRS. Additionally or alternatively, the first reference signal may be a cell-specific reference signal, or a DMRS. The DL transmission may include a DL grant, and demodulation of the DL grant may be based on a CRS. The DL transmission may also include a second reference signal associated with data. In some examples, the second reference signal may be a UERS. Additionally or alternatively, the second reference signal may be a DMRS or a PDSCH. The DL transmission may also include broadcast data (e.g., broadcast PDSCH data). The broadcast data may be indicated by the DL grant. The first signal (e.g., the CRS) and the second signal (e.g., the UERS), may be used by UEs 115-a and 115-b to demodulate broadcast data (e.g., broadcast PDSCH transmissions) transmitted using the broadcast communication links 205-a and 205-b.

The UEs 115-a and 115-b may identify that the CRS and UERS are associated with the broadcast data, and may use both CRS and UERS for channel estimation and frequency offset estimation. The UEs 115-a and 115-b may demodulate the broadcast data based at least in part on the channel estimation and frequency offset estimation. The base station 105-a, in some examples, may transmit the UERS using one or more antenna ports that are mapped to corresponding antenna ports of the CRS. For example, the base station may transmit UERS on antenna port 7 when one CRS port (port 0) is configured, and may transmit UERS on antenna ports 7 and 8 when two CRS ports (port 0 and 1) are configured.

The base station 105-a may apply no precoding, or a same precoding, to the CRS, UERS, and broadcast data. In some examples, the UEs 115 may assume a same precoding (or no precoding) is applied to the CRS and UERS, and perform a one-shot frequency offset estimation based on phase difference between CRS and UERS, and may use the frequency offset estimation in demodulating the broadcast data. In some examples, the UEs 115 may combine CRS and UERS, assuming a same precoding (or no precoding) is applied, to enhance channel estimation, which may be used in demodulating the broadcast data. In some examples, broadcast communication links 205 and 210 may use eCC communications techniques, although techniques described herein are also applicable to other communications protocols and techniques, such as LTE or shared radio frequency spectrum band communications techniques (e.g., license assisted access (LAA), LTE in unlicensed spectrum, MuLTEFire, etc.).

The base station 105-a, in some examples, may always transmit CRS and UERS whenever broadcast PDSCH is transmitted. Thus, UEs 115 may, in such examples, use both CRS and UERS for demodulating broadcast PDSCH. In other examples the base station 105-a may transmit signaling indicating that both the CRS and the UERS are associated with the broadcast data. Such signaling may be semi-static signaling that applies to a plurality of broadcast data, or may be dynamic signaling that applies to one set of broadcast data. The semi-static signaling may include, for example, an indication that certain transmission types (e.g., broadcast PDSCH transmissions) will use both CRS and UERS. The semi-static signaling may be provided, for example, in SIB signaling or radio resource control (RRC) signaling. In examples where the base station 105-a provides dynamic signaling, the presence/absence of UERS may be dynamically indicated for each broadcast PDSCH transmission. In one example where base station 105-a uses dynamic signaling, a previously unused field in some downlink control information (DCI) formats for DL grant in a common search space may indicate the presence of UERS. For example, DCI format 1A in LTE has a new data indicator (NDI) field that is unused for broadcast PDSCH, which may be used to signal "UERS indicator" to identify whether only CRS is present or whether both CRS and UERS are present. Similarly, an eCC DCI format for an eCC DL grant may define a NDI field that is reserved for broadcast PDSCH transmissions and that may be used to signal a UERS indication. UEs 115, when a DL grant is received, may identify the UERS indicator field and identify that CRS, or both CRS and UERS are associated with a broadcast PDSCH transmission. In some examples, when the UERS indicator is set, two symbols of UERS may be present, and mapped to antenna port 7 in case of one CRS port, and mapped to antenna ports 7 and 8 in case of 2 CRS ports. In some examples, UEs 115 may assume that mapped ports (e.g., Ports 7 (UERS) and 0 (CRS) and antenna ports 8 (UERS) and 1 (CRS)) share the same precoding.

Figure 3:
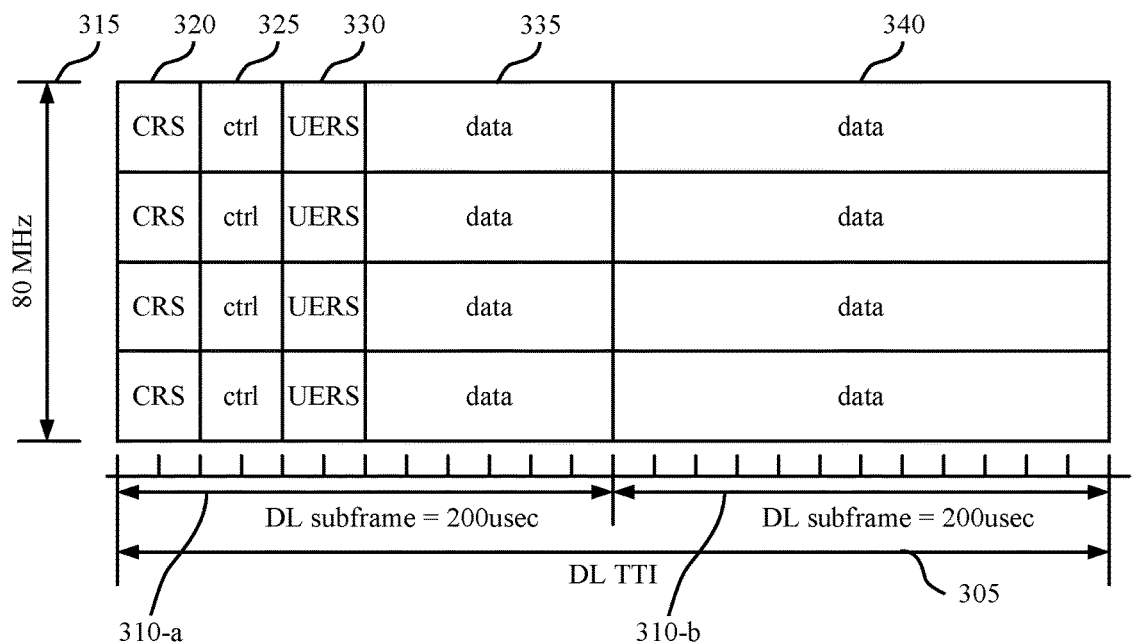
FIG. 3 illustrates an example of a downlink transmission time interval (TTI) structure that supports reference signal transmission in wireless communications with multiple receivers in accordance with aspects of the present disclosure.

FIG. 3 illustrates an example of a DL TTI structure 300 that supports reference signal transmission in wireless communications with multiple receivers. In some cases, TTI structure 300 may represent aspects of techniques performed by a UE 115 or base station 105 as described with reference to FIGS. 1-2. In the example of FIG. 3, TTI structure 300 includes a DL TTI 305, which may include a first DL subframe 310-a and a second DL subframe 310-b. The DL TTI structure 300 may be transmitted using an 80 MHz bandwidth 315, which may include four 20 MHz channels, although other channel bandwidths may be used in other examples. The first DL subframe 310-a, in this example, may include a reference signal associated with control information. The reference signal associated with control information may be a CRS 320, or may be a cell-specific reference signal, a DMRS, or a PDCCH. The first DL subframe 310-a, in this example, may include another reference signal associated with data. The reference signal associated with data may be a UERS 330, a DMRS, or a PDSCH. The first DL subframe 310-a may further include control data 325, and broadcast data 335. The second DL subframe 310-b, in this example, may include broadcast data 340. The data 335 and 340 may include broadcast data, such as broadcast PDSCH data that is transmitted to multiple UEs.

A UE receiving the first DL subframe 310-a and the second DL subframe 310-b may identify that the first reference signal (e.g., CRS 320) and the second reference signal (e.g., UERS 330) are associated with the transmission of broadcast data 335 and 340, and may use both CRS 320 and UERS 330 for channel estimation and frequency offset estimation. In some examples, the UERS 330 may be a repeated version of CRS 320 and may be transmitted using a same precoding. The UE may demodulate the broadcast data 335 and 340 based at least in part on the channel estimation and frequency offset estimation. Frequency offset may be estimated, in some examples, by using a phase difference between CRS 320 and UERS 330, assuming a same precoding is applied to both signals. Channel estimation may be performed by combining the CRS 320 and UERS 330, assuming the UERS 330 is a repeated CRS 320 and uses a same precoding. As indicated above, the same precoding between the CRS 320, UERS 330, and broadcast data 335 and 340, may be no precoding applied to any of the transmissions.

Figure 4:
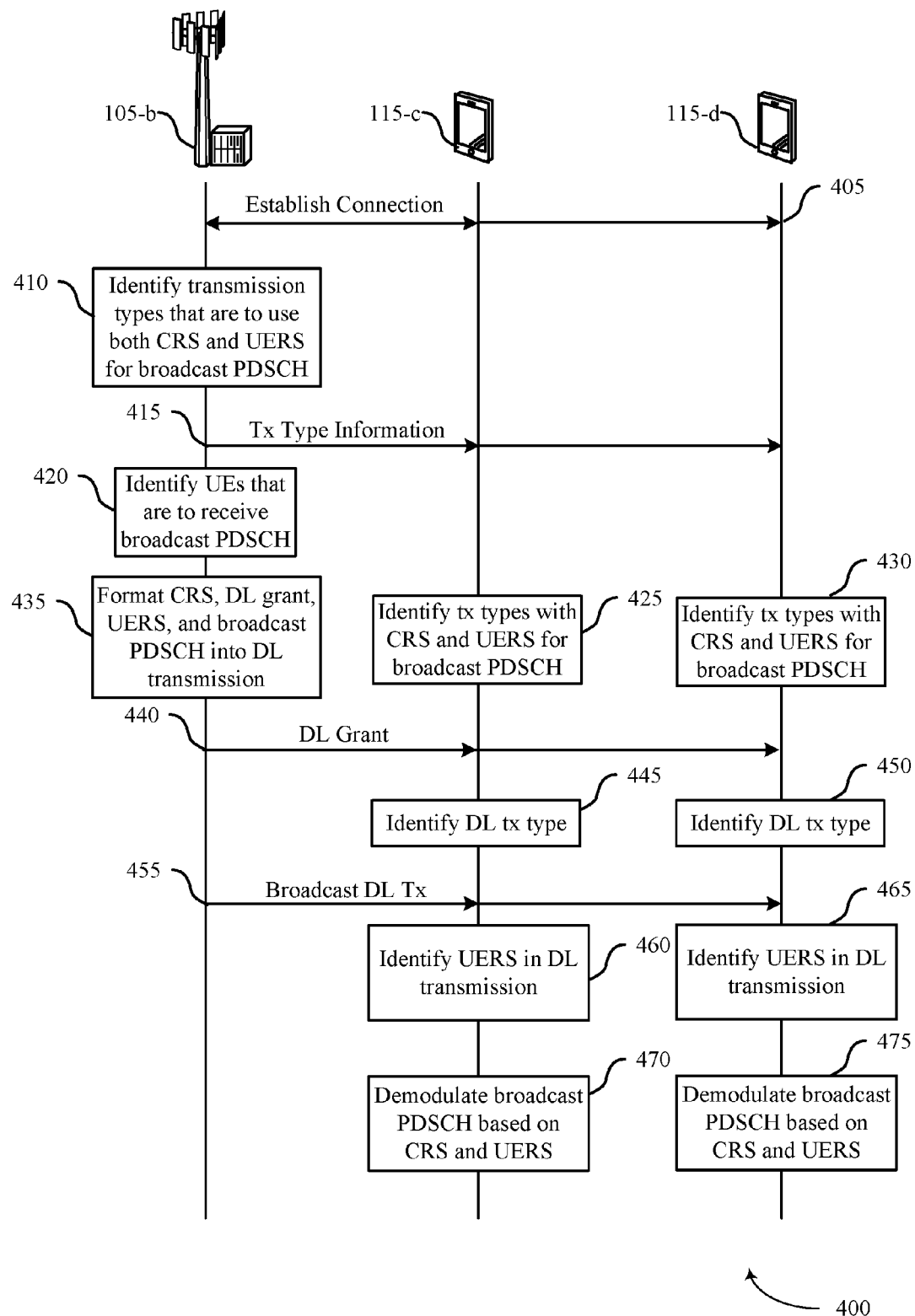
FIG. 4 illustrates an example of a process flow in a system that supports reference signal transmission in wireless communications with multiple receivers in accordance with aspects of the present disclosure.

FIG. 4 illustrates an example of a process flow 400 for reference signal transmission in wireless communications with multiple receivers in accordance with various aspects of the present disclosure. Process flow 400 may include base station 105-a, first UE 115-c, and second UE 115-d, which may be examples of the corresponding devices described with reference to FIGS. 1 and 2.

The base station 105-b may establish connections 405 between UEs 115-c and 115-d. The connections 405 may be established according to connection establishment techniques used in wireless communications (e.g., LTE connection establishment and reestablishment techniques, eCC connection establishment techniques, connection establishment techniques for shared radio frequency spectrum, etc.). The connections 405 may be bidirectional connections that support unicast transmissions, and may also configure the first UE 115-c and second UE 115-d for broadcast transmissions from the base station 105-b.

At block 410, base station 105-b may identify transmission types that are to use both CRS and UERS for broadcast data. In some examples, the base station 105-b may identify broadcast PDSCH transmissions as transmission types that are to use both CRS and UERS. In some examples, the base station 105-b may identify broadcast SIB or paging transmissions as transmission types that are to use both CRS and UERS.

Base station 105-b may transmit transmission type information 415 to UEs 115, which may indicate the different transmission types that use both CRS and UERS. In some examples, CRS and UERS may always be used for certain broadcast data, such as whenever broadcast PDSCH is transmitted. Transmission type information 415 in such examples may indicate the transmission types for transmissions from the base station 105-b that use CRS and UERS. In some examples, transmission type information 415 may be semi-static signaling that applies to certain transmission types until another semi-static signal is provided that changes the transmission types that have both CRS and UERS. The semi-static signaling may be provided, for example, in SIB signaling or radio resource control (RRC) signaling. In further examples, an indication of whether a particular transmissions includes CRS and UERS may be dynamically indicated in a DL grant 440, and may be dynamic signaling that applies to one set of broadcast data. In some examples where dynamic signaling indicates the presence/absence of UERS, the indication may be dynamically indicated for each broadcast PDSCH transmission and the transmission type information 415 may not be transmitted.

At block 420, base station 105-b may identify UEs that are to receive broadcast data in a broadcast DL transmission, such as a broadcast PDSCH transmission. Such broadcast data may include, for example, SIB data, paging data, or any combination thereof. The base station 105-b may identify, for example, that both first UE 115-c and second UE 115-d are to receive broadcast data in a broadcast DL transmission.

The first UE 115-c, at block 425, may identify transmission types with CRS and UERS for DL broadcast data transmissions, such as broadcast PDSCH transmissions. Similarly, the second UE 115-d, at block 430, may identify transmission types with CRS and UERS for DL broadcast data transmissions, such as broadcast PDSCH transmissions. The identification of transmission types that include both CRS and UERS may be determined based on the transmission type information 415, may be based on configured transmission types established in when the connections are established, transmission types identified in a standard, or any combination thereof.

At block 435, the base station 105-b may format CRS, a DL grant, UERS, and broadcast data (e.g., broadcast PDSCH) into a DL transmission. The CRS, UERS, and broadcast data may be configured in a TTI structure such as illustrated in FIG. 3, although other TTI structures may be used in other examples.

The base station 105-b may transmit a DL grant 440, which may allocate DL resources for broadcast DL data. In examples where dynamic signaling is used to indicate the presence of both CRS and UERS, the DL grant 440 may include an indication that both CRS and UERS are present. In some examples, DL grant 440 may include DCI in a format that may include a UERS indicator, such as discussed above with respect to FIG. 2. In examples that use semi-static signaling of transmission type information 415, the UEs 115 may determine from DL grant 440 that the associated DL data is a broadcast DL data that may be based on either CRS alone or both CRS and UERS, and whether it is CRS alone or CRS and UERS is determined by the semi-static signaling. The first UE 115-*c* may determine DL transmission type at block 445, and the second UE 115-*d* may determine DL transmission type at block 450.

Base station 105-*b* may then transmit broadcast DL transmission 455 to the UEs 115. As discussed above, the broadcast DL transmission 455 may be transmitted to multiple UEs 115, which may include one or more UEs 115 that have relatively poor channel conditions. Through transmission of both CRS and UERS in DL transmission 455, reliability or successfully receiving and decoding data (e.g., broadcast data) transmitted in the broadcast DL transmission 455 may be enhanced.

The first UE 115-*c* may, at block 460, identify UERS in DL transmission. Similarly, the second UE 115-*d* may, at block 465, identify UERS in DL transmission. The identification of UERS in the DL transmission may be determined as discussed above, by identifying a transmission type of the broadcast data (e.g., data within broadcast DL transmission 455), and identifying CRS and UERS based on a static configuration, semi-static signaling, or dynamic signaling, associated with the DL data type.

The first UE 115-*c*, at block 470, may demodulate the broadcast data transmission based on CRS and UERS. Similarly, the second UE 115-*d* at block 475 may demodulate the broadcast data transmission based on CRS and UERS. Demodulation of broadcast data transmission, such as broadcast PDSCH transmissions, based on CRS and UERS may be performed based at least in part on a frequency offset determination that is based a phase difference between CRS and UERS. Demodulation of the broadcast data transmission may also be based on combining CRS and UERS to obtain an enhanced channel estimation.

Figure 5:
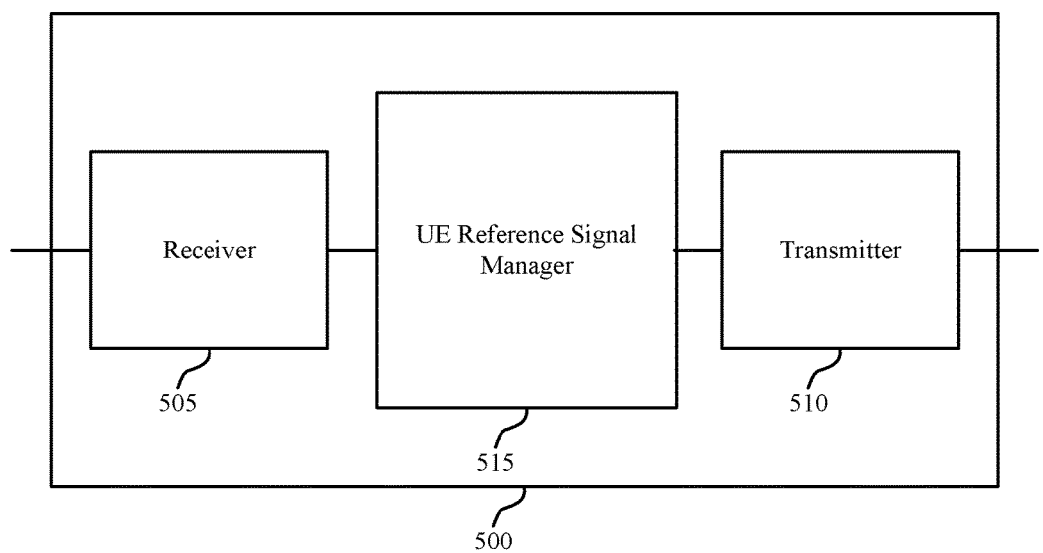
FIGS. 5 through 7 show diagrams of a wireless device that supports reference signal transmission in wireless communications with multiple receivers in accordance with aspects of the present disclosure.

FIG. 5 shows a diagram of a wireless device 500 that supports reference signal transmission in wireless communications with multiple receivers in accordance with various aspects of the present disclosure. Wireless device 500 may be an example of aspects of a UE 115 described with reference to FIGS. 1 and 2. Wireless device 500 may include receiver 505, transmitter 510 and UE reference signal manager 515. Wireless device 500 may also include a processor. Each of these components may be in communication with each other.

The receiver 505 may receive information such as packets, user data, or control information associated with various information channels (e.g., control channels, data channels, and information related to reference signal transmission in wireless communications with multiple receivers, etc.). Information may be passed on to other components of the device. The receiver 505 may be an example of aspects of the transceiver 825 described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 described with reference to FIG. 8. The transmitter 510 may include a single antenna, or it may include a plurality of antennas.

The UE reference signal manager 515 may receive a DL transmission from a base station, where the DL transmission is broadcast to a set of UEs and has a DL grant, a CRS associated with the DL grant, broadcast data, and a UERS associated with the broadcast data, identify that the CRS and UERS are associated with the broadcast data, and demodulate the broadcast data based on the CRS and UERS. The UE reference signal manager 515 may also be an example of aspects of the UE reference signal manager 805 described with reference to FIG. 8.

Figure 6:
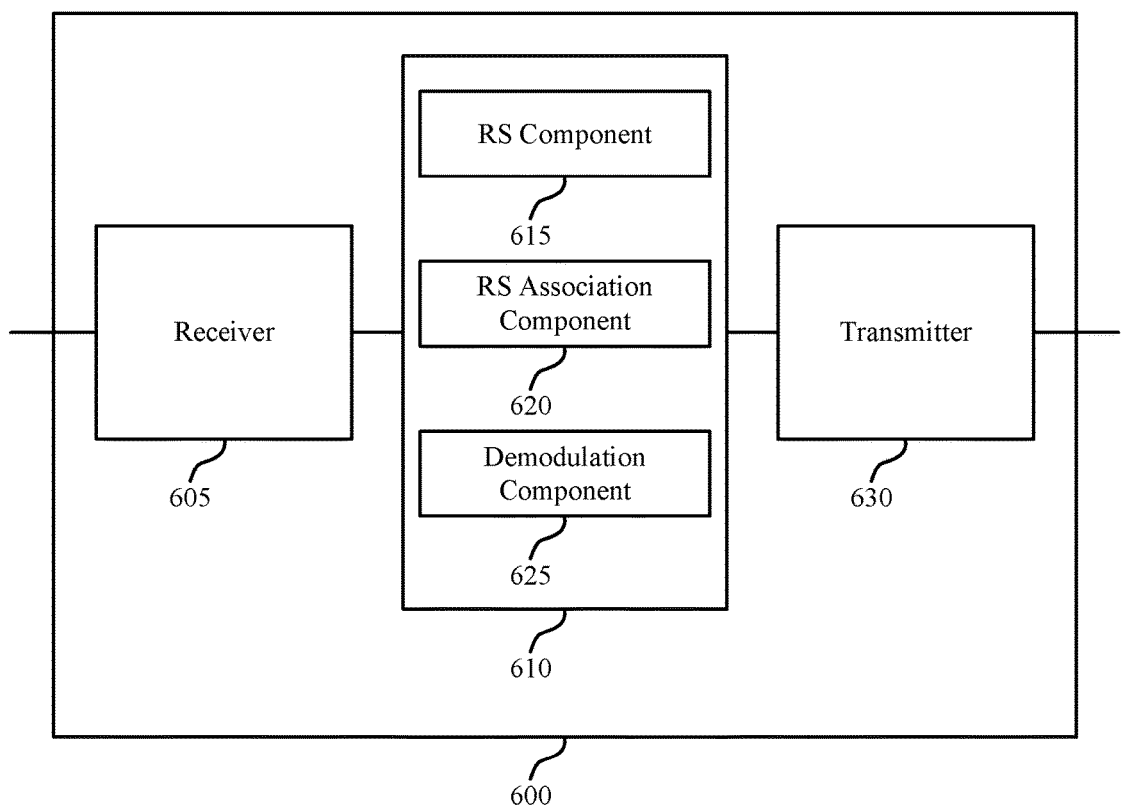

FIG. 6 shows a diagram of a wireless device 600 that supports reference signal transmission in wireless communications with multiple receivers in accordance with various aspects of the present disclosure. Wireless device 600 may be an example of aspects of a wireless device 500 or a UE 115 described with reference to FIGS. 1, 2, and 5. Wireless device 600 may include receiver 605, UE reference signal manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE reference signal manager 610 may be an example of aspects of UE reference signal manager 515 described with reference to FIG. 5. The UE reference signal manager 610 may include a reference signal (RS) component 615, RS association component 620 and demodulation component 625. The UE reference signal manager 610 may be an example of aspects of the UE reference signal manager 805 described with reference to FIG. 8.

The RS component 615 may, in conjunction with receiver 605, receive a DL transmission from a base station, where the DL transmission is broadcast to a set of UEs and has a DL grant, a CRS associated with the DL grant, broadcast data, and a UERS associated with the broadcast data. In some cases, a one or more antenna port of the UERS is mapped to a corresponding one or more antenna port of a CRS transmission.

The RS association component 620 may identify that the UERS is present and is associated with the broadcast data. In some cases, identifying the CRS and UERS are associated with the broadcast data includes receiving signaling that indicates that both CRS and UERS are present and associated with the broadcast data. In some cases, the signaling is semi-static signaling that applies to certain types of broadcast data that are transmitted to the set of UEs.

In some cases, the signaling is dynamic signaling that applies to the broadcast data. In some cases, the dynamic signaling is provided in a DL grant associated with the broadcast data. In some cases, the dynamic signaling is provided in a UERS indicator bit within DCI provided in the DL grant. In some cases, the dynamic signaling is provided in a new data indicator field in DCI format 1A.

The demodulation component 625 may demodulate the broadcast data based on an estimated frequency offset based on the CRS and UERS, demodulate the broadcast data based on a channel estimation determined by combining CRS and UERS, or any combination thereof. In some cases, the demodulating the broadcast data is further based on an assumption that a same precoding is used for transmission of the CRS and UERS. In some cases, demodulating the broadcast data includes estimating a frequency offset based on a phase difference between the CRS and UERS.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
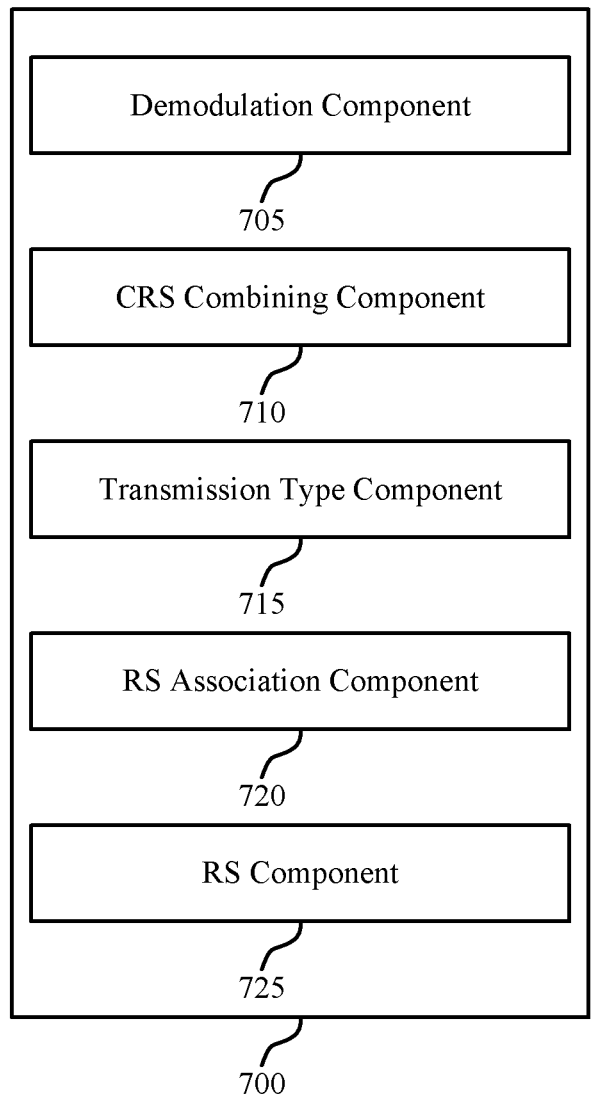

FIG. 7 shows a diagram of a UE reference signal manager 700 which may be an example of the corresponding component of wireless device 500 or wireless device 600. That is, UE reference signal manager 700 may be an example of aspects of UE reference signal manager 515 or UE reference signal manager 610 described with reference to FIGS. 5 and 6. The UE reference signal manager 700 may also be an example of aspects of the UE reference signal manager 805 described with reference to FIG. 8.

The UE reference signal manager 700 may include demodulation component 705, CRS combining component 710, transmission type component 715, RS association component 720 and RS component 725. Each of these modules may communicate, directly or indirectly, with one another (e.g., via one or more buses).

The demodulation component 705 may demodulate the broadcast data based on the estimated frequency offset, demodulate the broadcast data based on the channel estimation, each of which may be based on the CRS and UERS. In some examples, the CRS combining component 710 may combine the CRS and UERS for use in a channel estimation.

The transmission type component 715 may identify a transmission type of the data is associated with both CRS and UERS. The RS association component 720 may identify that the CRS and UERS are associated with the broadcast data, and identify that the UERS is present and is associated with the broadcast data.

The RS component 725 may receive a DL transmission from a base station, where the DL transmission is broadcast to a set of UEs and has a DL grant, a CRS associated with the DL grant, broadcast data, and a UERS associated with the DL grant. In some cases, a one or more antenna port of the UERS is mapped to a corresponding one or more antenna port of the CRS.

Figure 8:
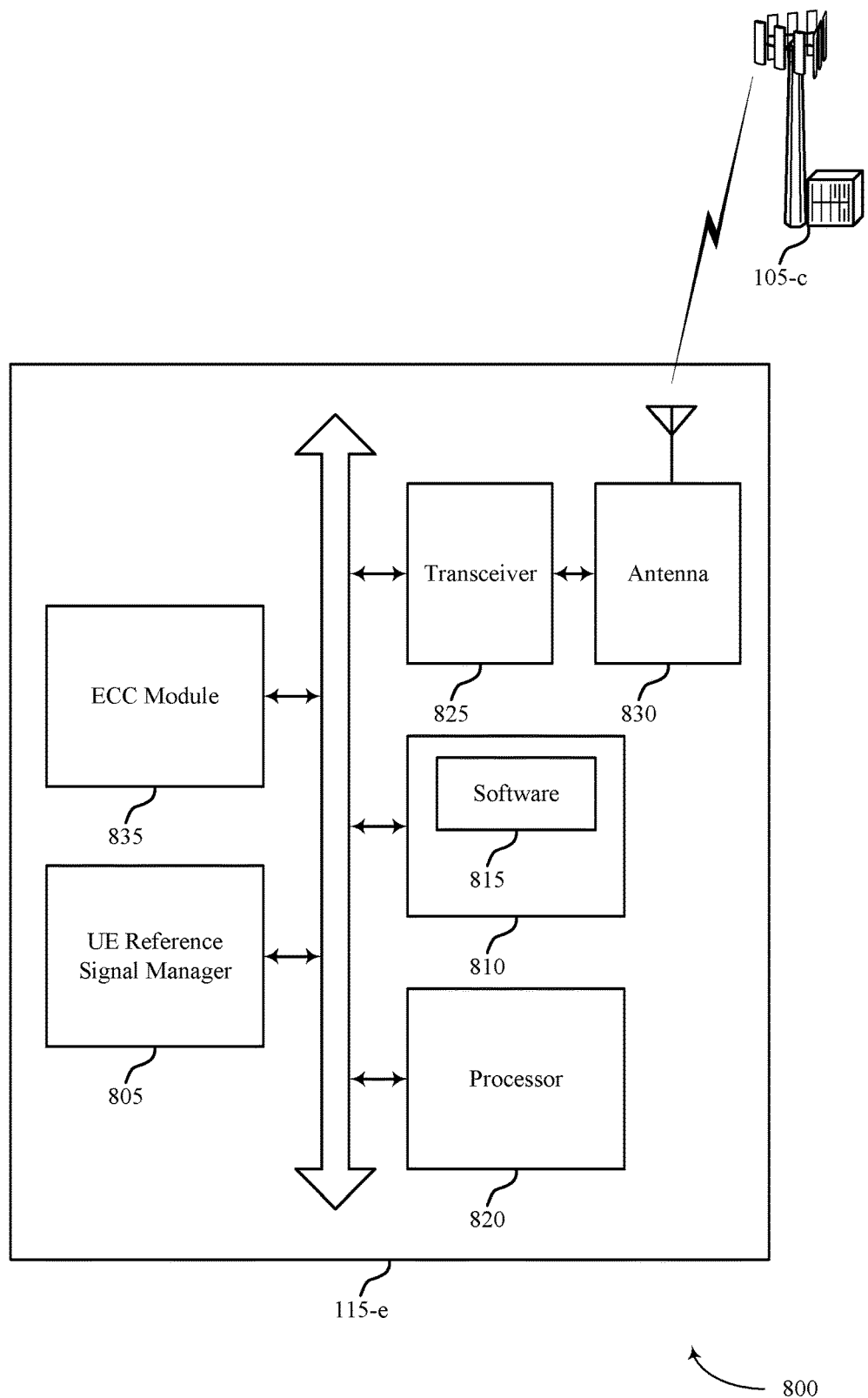
FIG. 8 illustrates a diagram of a system including a UE that supports reference signal transmission in wireless communications with multiple receivers in accordance with aspects of the present disclosure.

FIG. 8 shows a diagram of a system 800 including a device that supports reference signal transmission in wireless communications with multiple receivers in accordance with various aspects of the present disclosure. For example, system 800 may include UE 115-e, which may be an example of a wireless device 500, a wireless device 600, or a UE 115 as described with reference to FIGS. 1, 2, and 5 through 7.

UE 115-e may also include UE reference signal manager 805, memory 810, processor 820, transceiver 825, antenna 830 and ECC module 835. Each of these modules may communicate, directly or indirectly, with one another (e.g., via one or more buses). The UE reference signal manager 805 may be an example of a UE reference signal manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., reference signal transmission in wireless communications with multiple receivers, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions. ECC module 835 may enable operations using eCCs such as communication using shared or unlicensed spectrum, using reduced TTIs or subframe durations, or using a large number of component carriers.

Figure 9:
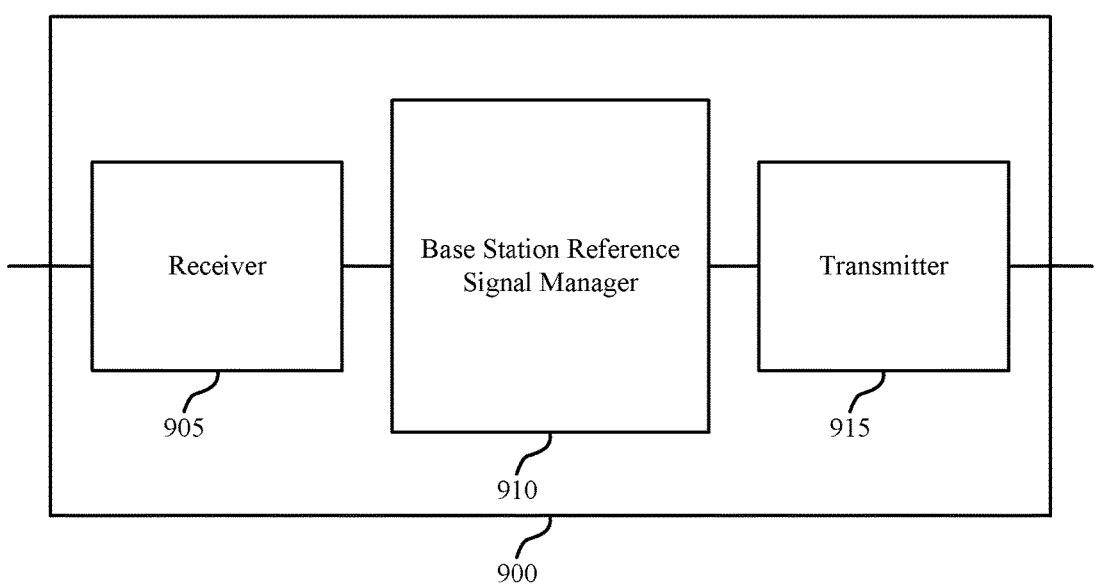
FIGS. 9 through 11 show diagrams of a wireless device that supports reference signal transmission in wireless communications with multiple receivers in accordance with aspects of the present disclosure.

FIG. 9 shows a diagram of a wireless device 900 that supports reference signal transmission in wireless communications with multiple receivers in accordance with various aspects of the present disclosure. Wireless device 900 may be an example of aspects of a base station 105 described with reference to FIGS. 1 and 2. Wireless device 900 may include receiver 905, base station reference signal manager 910 and transmitter 915. Wireless device 900 may also include a processor. Each of these components may be in communication with each other.

The receiver 905 may receive information such as packets, user data, or control information associated with various information channels (e.g., control channels, data channels, and information related to reference signal transmission in wireless communications with multiple receivers, etc.). Information may be passed on to other components of the device. The receiver 905 may be an example of aspects of the transceiver 1225 described with reference to FIG. 12.

The base station reference signal manager 910 may identify a set of receivers that are to receive a broadcast DL transmission, format a CRS, a DL grant, a UERS, and broadcast data in the broadcast DL transmission, and transmit the broadcast DL transmission to the set of receivers. The base station reference signal manager 910 may also be an example of aspects of the base station reference signal manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
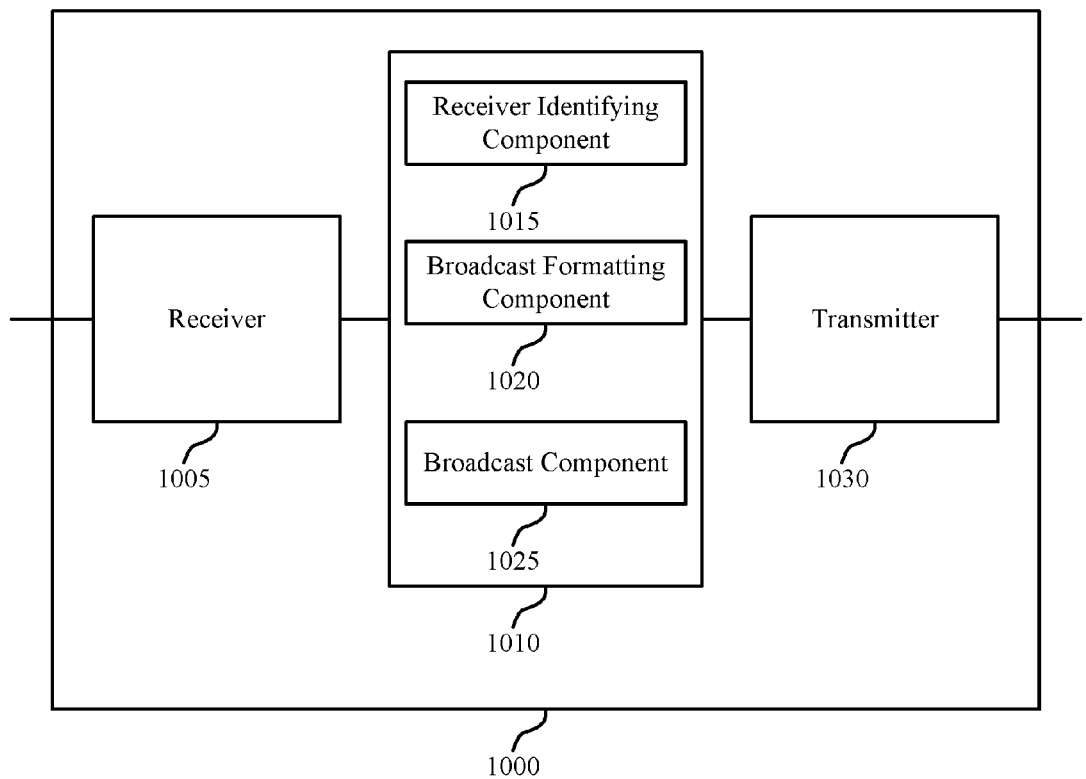

FIG. 10 shows a diagram of a wireless device 1000 that supports reference signal transmission in wireless communications with multiple receivers in accordance with various aspects of the present disclosure. Wireless device 1000 may be an example of aspects of a wireless device 900 or a base station 105 described with reference to FIGS. 1, 2, and 9. Wireless device 1000 may include receiver 1005, base station reference signal manager 1010 and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station reference signal manager 1010 may be an example of aspects of base station reference signal manager 910 described with reference to FIG. 9. The base station reference signal manager 1010 may include receiver identifying component 1015, broadcast formatting component 1020 and broadcast component 1025. The base station reference signal manager 1010 may be an example of aspects of the base station reference signal manager 1205 described with reference to FIG. 12.

The receiver identifying component 1015 may identify a set of receivers that are to receive a broadcast DL transmission. The broadcast formatting component 1020 may format a CRS, a DL grant, a UERS, and broadcast data in the broadcast DL transmission. The broadcast component 1025 may, in conjunction with transmitter 1030, transmit the broadcast DL transmission to the set of receivers.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize a plurality of antennas.

Figure 11:
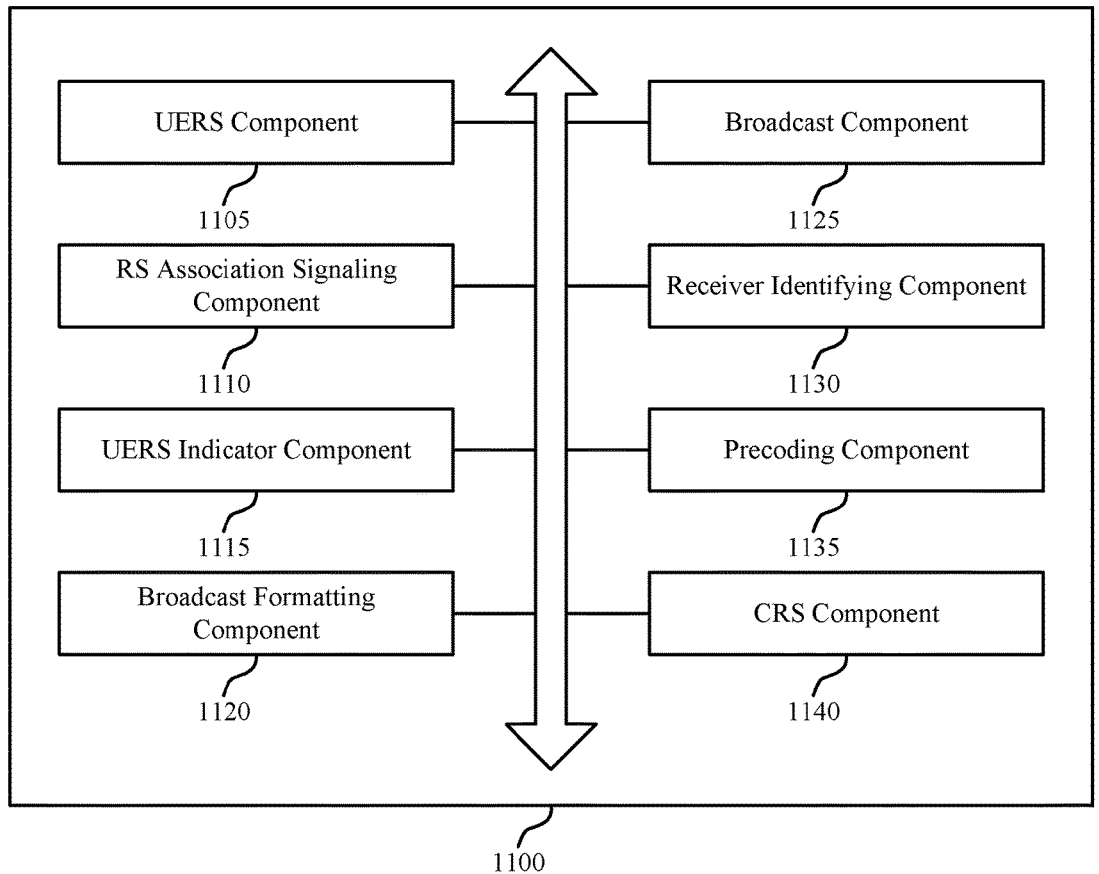

FIG. 11 shows a diagram of a base station reference signal manager 1100 which may be an example of the corresponding component of wireless device 900 or wireless device 1000. That is, base station reference signal manager 1100 may be an example of aspects of base station reference signal manager 910 or base station reference signal manager 1010 described with reference to FIGS. 9 and 10. The base station reference signal manager 1100 may also be an example of aspects of the base station reference signal manager 1205 described with reference to FIG. 12.

The base station reference signal manager 1100 may include UERS component 1105, RS association signaling component 1110, UERS indicator component 1115, broadcast formatting component 1120, broadcast component 1125, receiver identifying component 1130, precoding component 1135, and CRS component 1140. Each of these modules may communicate, directly or indirectly, with one another (e.g., via one or more buses).

The UERS component 1105 may transmit the UERS using a set of UERS antenna ports that are one-to-one mapped to a set of CRS antenna ports. The RS association signaling component 1110 may transmit signaling indicating that both the CRS and the UERS are associated with the broadcast data. The UERS indicator component 1115 may set a UERS indicator bit within DCI provided in the DL grant. The broadcast formatting component 1120 may format a CRS, a DL grant, a UERS, and broadcast data in the broadcast DL transmission.

The broadcast component 1125 may transmit the broadcast DL transmission to the set of receivers. The receiver identifying component 1130 may identify a set of receivers that are to receive a broadcast DL transmission. The precoding component 1135 may apply a same precoding to the CRS and UERS. The CRS component 1140 may transmit the CRS using a first set of antenna ports.

Figure 12:
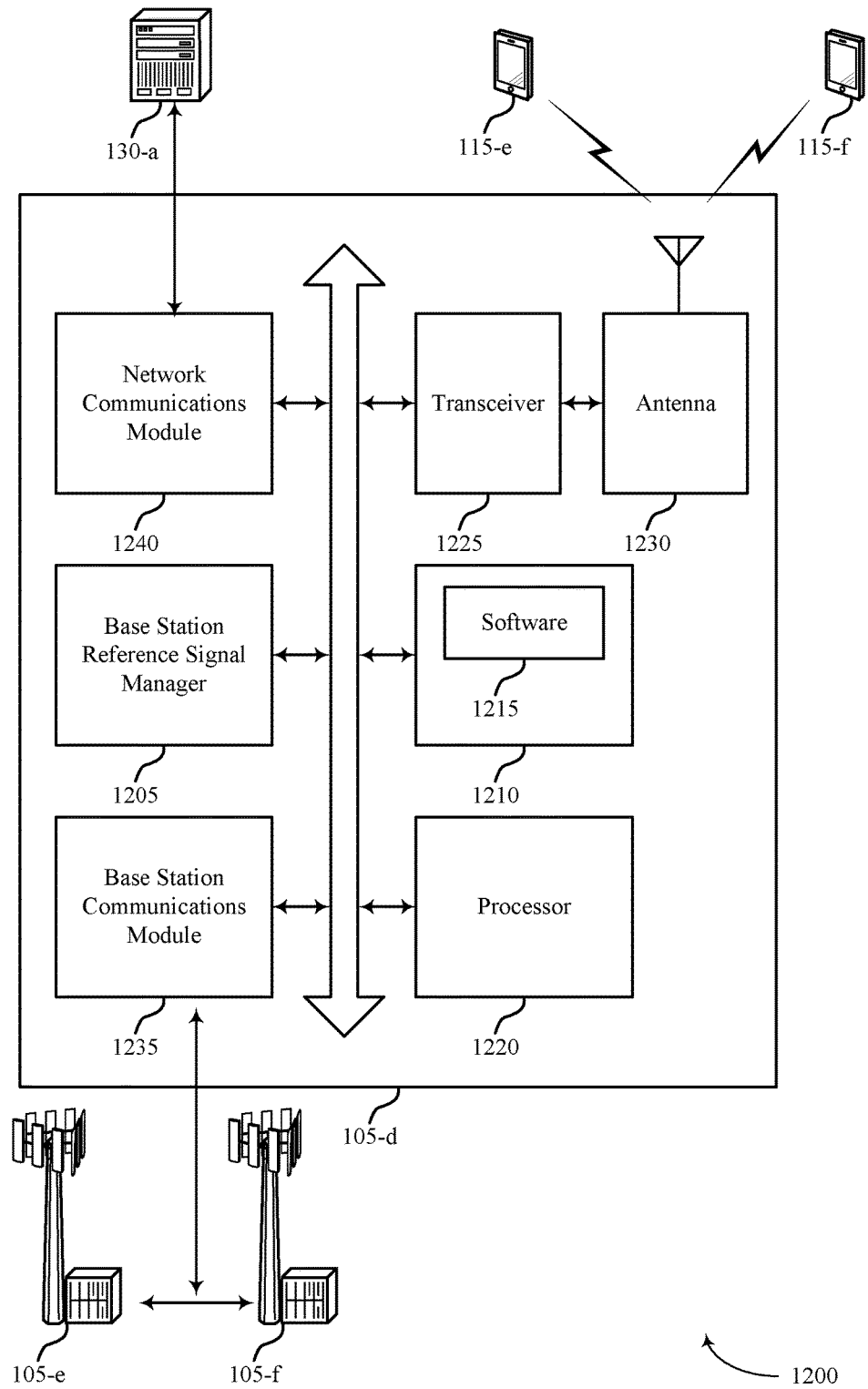
FIG. 12 illustrates a diagram of a system including a base station that supports reference signal transmission in wireless communications with multiple receivers in accordance with aspects of the present disclosure.

FIG. 12 shows a diagram of a wireless system 1200 including a device configured to support reference signal transmission in wireless communications with multiple receivers in accordance with various aspects of the present disclosure. For example, wireless system 1200 may include base station 105-d, which may be an example of a wireless device 900, a wireless device 1000, or a base station 105 as described with reference to FIGS. 1, 2, and 9 through 11. Base station 105-d may also include components for bi-directional voice and data communications including components for transmitting communications and components for receiving communications. For example, base station 105-d may communicate bi-directionally with one or more UEs 115.

Base station 105-d may also include base station reference signal manager 1205, memory 1210, processor 1220, transceiver 1225, antenna 1230, base station communications module 1235 and network communications module 1240. Each of these modules may communicate, directly or indirectly, with one another (e.g., via one or more buses). The base station reference signal manager 1205 may be an example of a base station reference signal manager as described with reference to FIGS. 9 through 11.

The memory 1210 may include RAM and ROM. The memory 1210 may store computer-readable, computer-executable software including instructions that, when executed, cause the processor to perform various functions described herein (e.g., reference signal transmission in wireless communications with multiple receivers, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
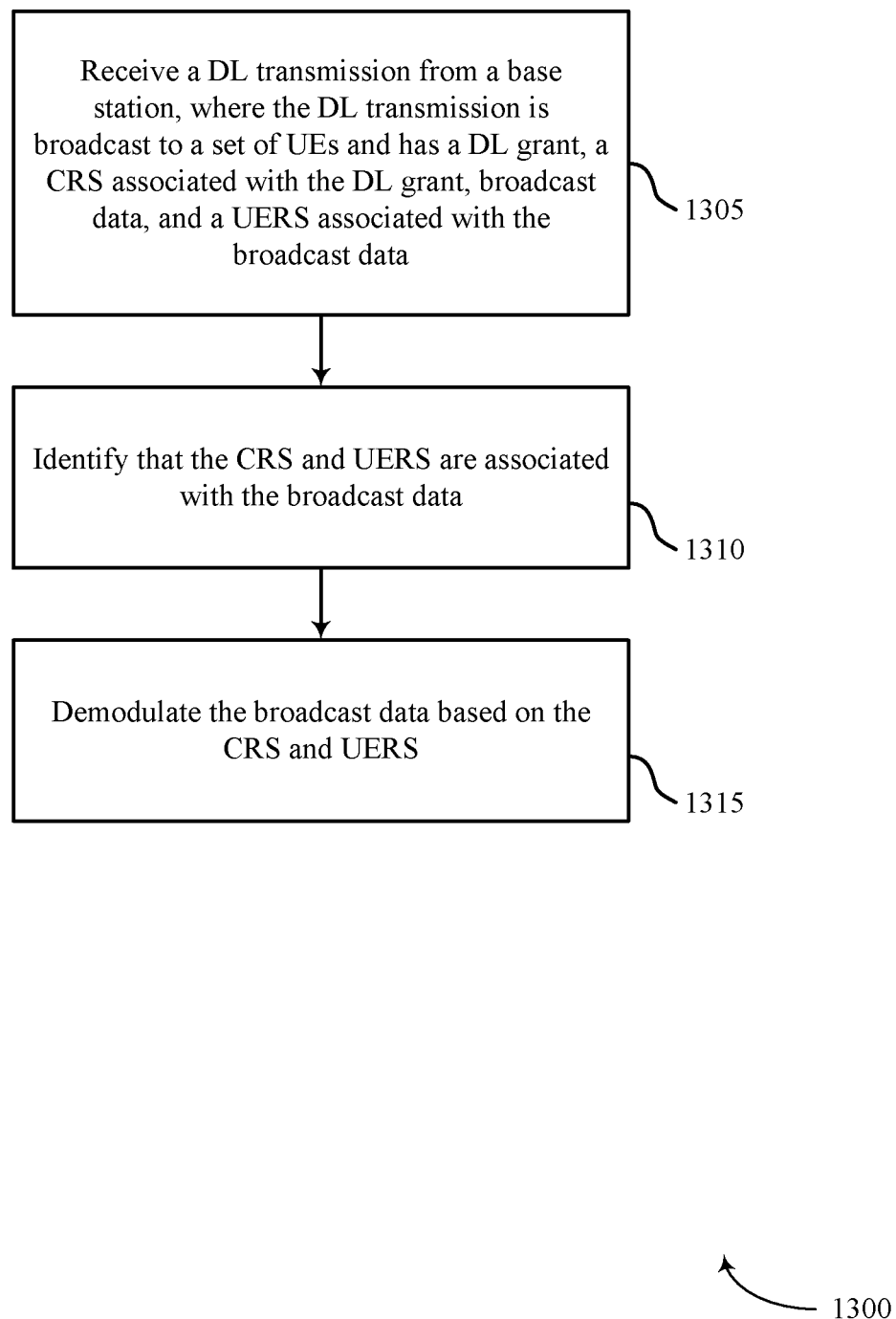
FIGS. 13 through 17 illustrate methods for reference signal transmission in wireless communications with multiple receivers in accordance with aspects of the present disclosure.

FIG. 13 shows a flowchart illustrating a method 1300 for reference signal transmission in wireless communications with multiple receivers in accordance with various aspects of the present disclosure. The operations of method 1300 may be implemented by a device such as a UE 115 or its components as described with reference to FIGS. 1 and 2. For example, the operations of method 1300 may be performed by the UE reference signal manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive a DL transmission from a base station, where the DL transmission is broadcast to a set of UEs and has a DL grant, a CRS associated with the DL grant, broadcast data, and a UERS associated with the broadcast data as described above with reference to FIGS. 2 through 4. In certain examples, the operations of block 1305 may be performed by the RS component as described with reference to FIGS. 6 and 7.

At block 1310, the UE 115 may identify that the CRS and UERS are associated with the broadcast data as described above with reference to FIGS. 2 through 4. In certain examples, the operations of block 1310 may be performed by the RS association component as described with reference to FIGS. 6 and 7.

At block 1315, the UE 115 may demodulate the broadcast data based on the CRS and UERS as described above with reference to FIGS. 2 through 4. In certain examples, the operations of block 1315 may be performed by the demodulation component as described with reference to FIGS. 6 and 7.

Figure 14:
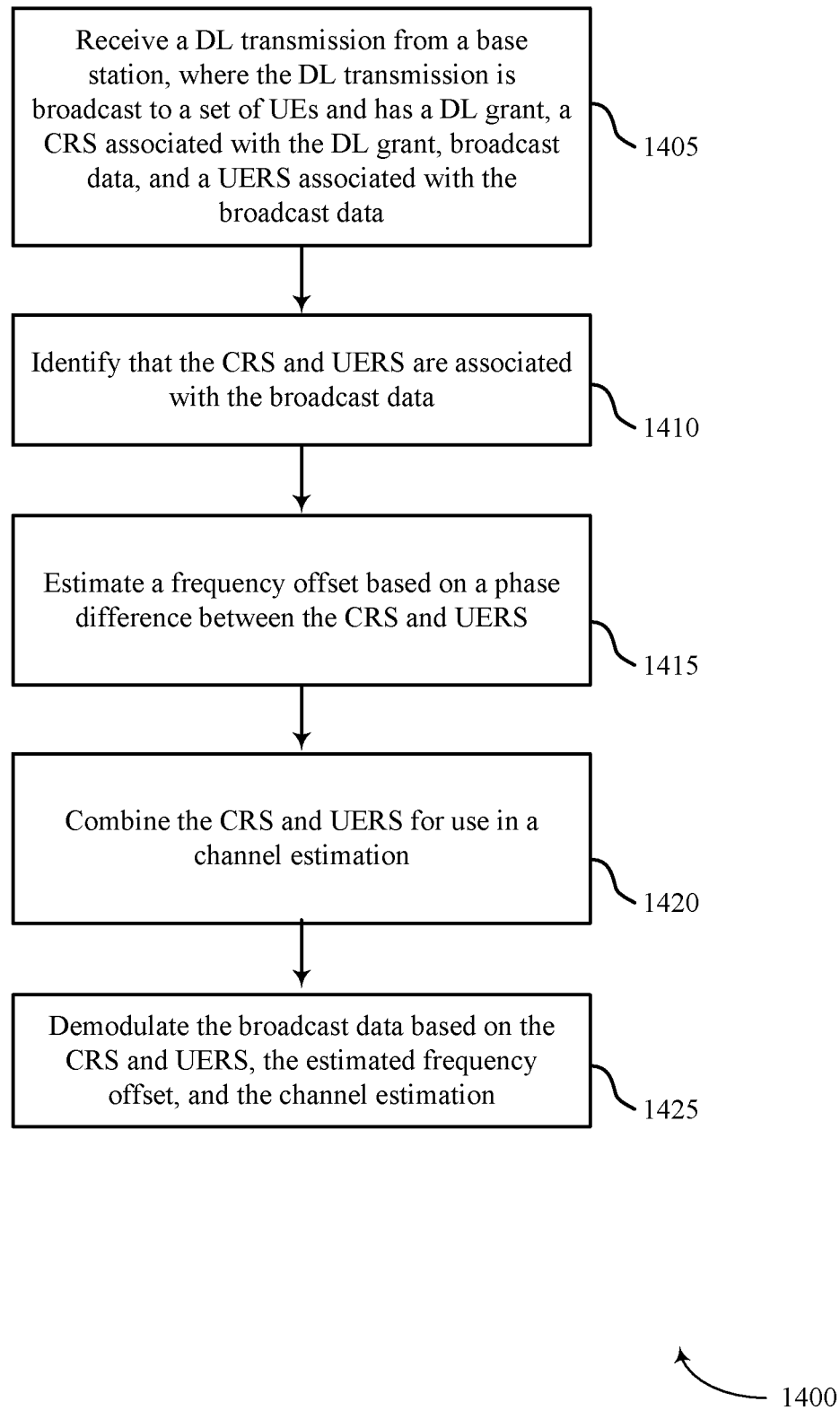

FIG. 14 shows a flowchart illustrating a method 1400 for reference signal transmission in wireless communications with multiple receivers in accordance with various aspects of the present disclosure. The operations of method 1400 may be implemented by a device such as a UE 115 or its components as described with reference to FIGS. 1 and 2. For example, the operations of method 1400 may be performed by the UE reference signal manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a DL transmission from a base station, where the DL transmission is broadcast to a set of UEs and has a DL grant, a CRS associated with the DL grant, broadcast data, and a UERS associated with the broadcast data as described above with reference to FIGS. 2 through 4. In certain examples, the operations of block 1405 may be performed by the RS component as described with reference to FIGS. 6 and 7.

At block 1410, the UE 115 may identify that the CRS and UERS are associated with the broadcast data as described above with reference to FIGS. 2 through 4. In certain examples, the operations of block 1410 may be performed by the RS association component as described with reference to FIGS. 6 and 7.

At block 1415, the UE 115 may estimate a frequency offset based on a phase difference between the CRS and UERS as described above with reference to FIGS. 2 through 4. In certain examples, the operations of block 1415 may be performed by the demodulation component as described with reference to FIGS. 6 and 7.

At block 1420, the UE 115 may combine the CRS and UERS for use in a channel estimation as described above with reference to FIGS. 2 through 4. In certain examples, the operations of block 1420 may be performed by the CRS combining component as described with reference to FIGS. 6 and 7.

At block 1425, the UE 115 may demodulate the broadcast data based on the CRS and UERS based on the estimated frequency offset and based on the channel estimation as described above with reference to FIGS. 2 through 4. In certain examples, the operations of block 1425 may be performed by the demodulation component as described with reference to FIGS. 6 and 7.

Figure 15:
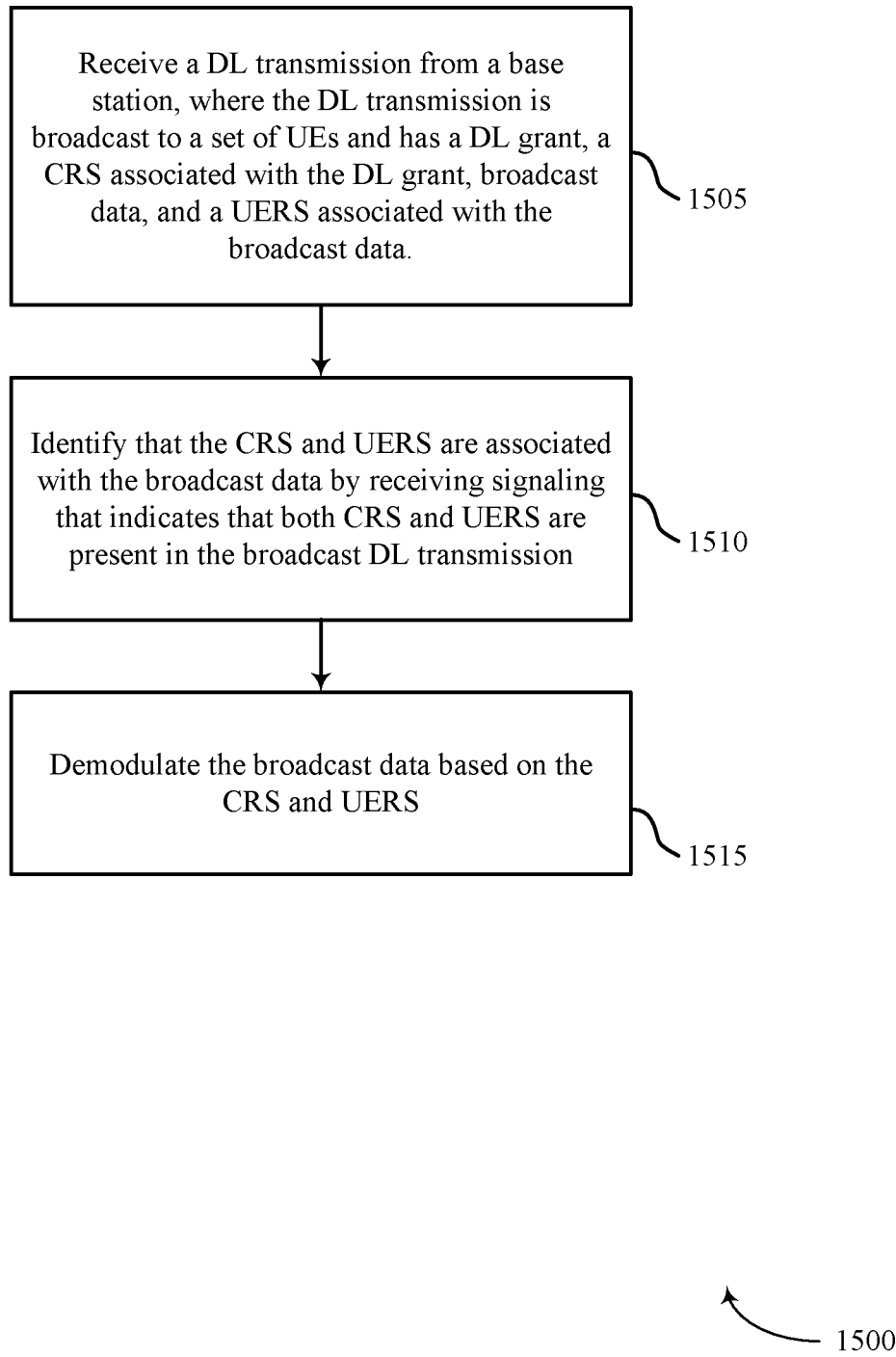

FIG. 15 shows a flowchart illustrating a method 1500 for reference signal transmission in wireless communications with multiple receivers in accordance with various aspects of the present disclosure. The operations of method 1500 may be implemented by a device such as a UE 115 or its components as described with reference to FIGS. 1 and 2. For example, the operations of method 1500 may be performed by the UE reference signal manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a DL transmission from a base station, where the DL transmission is broadcast to a set of UEs and has a DL grant, a CRS associated with the DL grant, broadcast data, and a UERS as described above with reference to FIGS. 2 through 4. In certain examples, the operations of block 1505 may be performed by the RS component as described with reference to FIGS. 6 and 7.

At block 1510, the UE 115 may identify that the CRS and UERS are associated with the broadcast data as described above with reference to FIGS. 2 through 4. In some cases, identifying the CRS and UERS in the broadcast DL transmission includes receiving signaling that indicates that both CRS and UERS are present and associated with the broadcast data. In certain examples, the operations of block 1510 may be performed by the RS association component as described with reference to FIGS. 6 and 7.

At block 1515, the UE 115 may demodulate the broadcast data based on the CRS and UERS as described above with reference to FIGS. 2 through 4. In certain examples, the operations of block 1515 may be performed by the demodulation component as described with reference to FIGS. 6 and 7.

Figure 16:
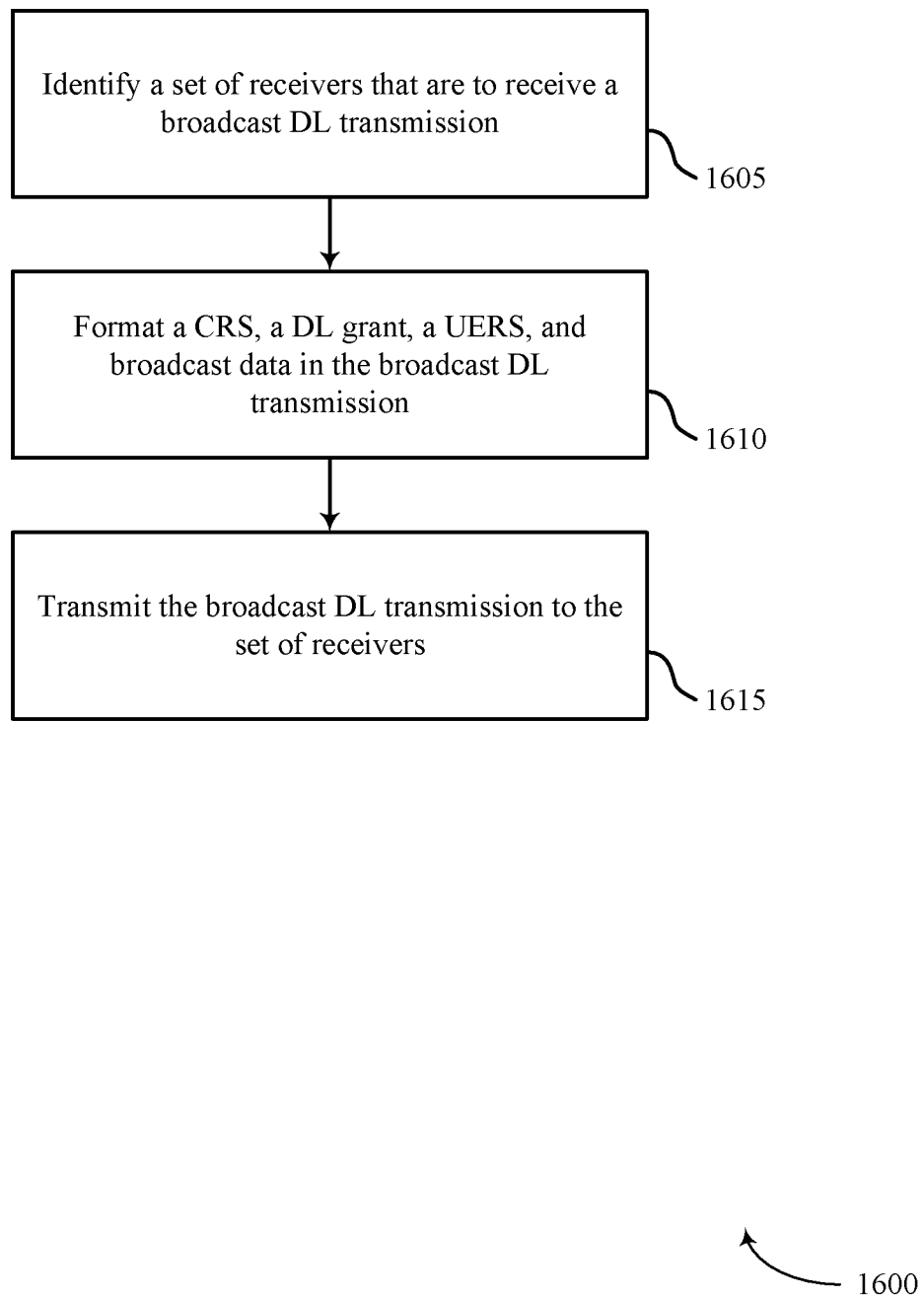

FIG. 16 shows a flowchart illustrating a method 1600 for reference signal transmission in wireless communications with multiple receivers in accordance with various aspects of the present disclosure. The operations of method 1600 may be implemented by a device such as a base station 105 or its components as described with reference to FIGS. 1 and 2. For example, the operations of method 1600 may be performed by the base station reference signal manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may identify a set of receivers that are to receive a broadcast DL transmission as described above with reference to FIGS. 2 through 4. In certain examples, the operations of block 1605 may be performed by the receiver identifying component as described with reference to FIGS. 10 and 11.

At block 1610, the base station 105 may format a CRS, a DL grant, a UERS, and broadcast data in the broadcast DL transmission as described above with reference to FIGS. 2 through 4. In certain examples, the operations of block 1610 may be performed by the broadcast formatting component as described with reference to FIGS. 10 and 11.

At block 1615, the base station 105 may transmit the broadcast DL transmission to the set of receivers as described above with reference to FIGS. 2 through 4. In certain examples, the operations of block 1615 may be performed by the broadcast component as described with reference to FIGS. 10 and 11.

Figure 17:
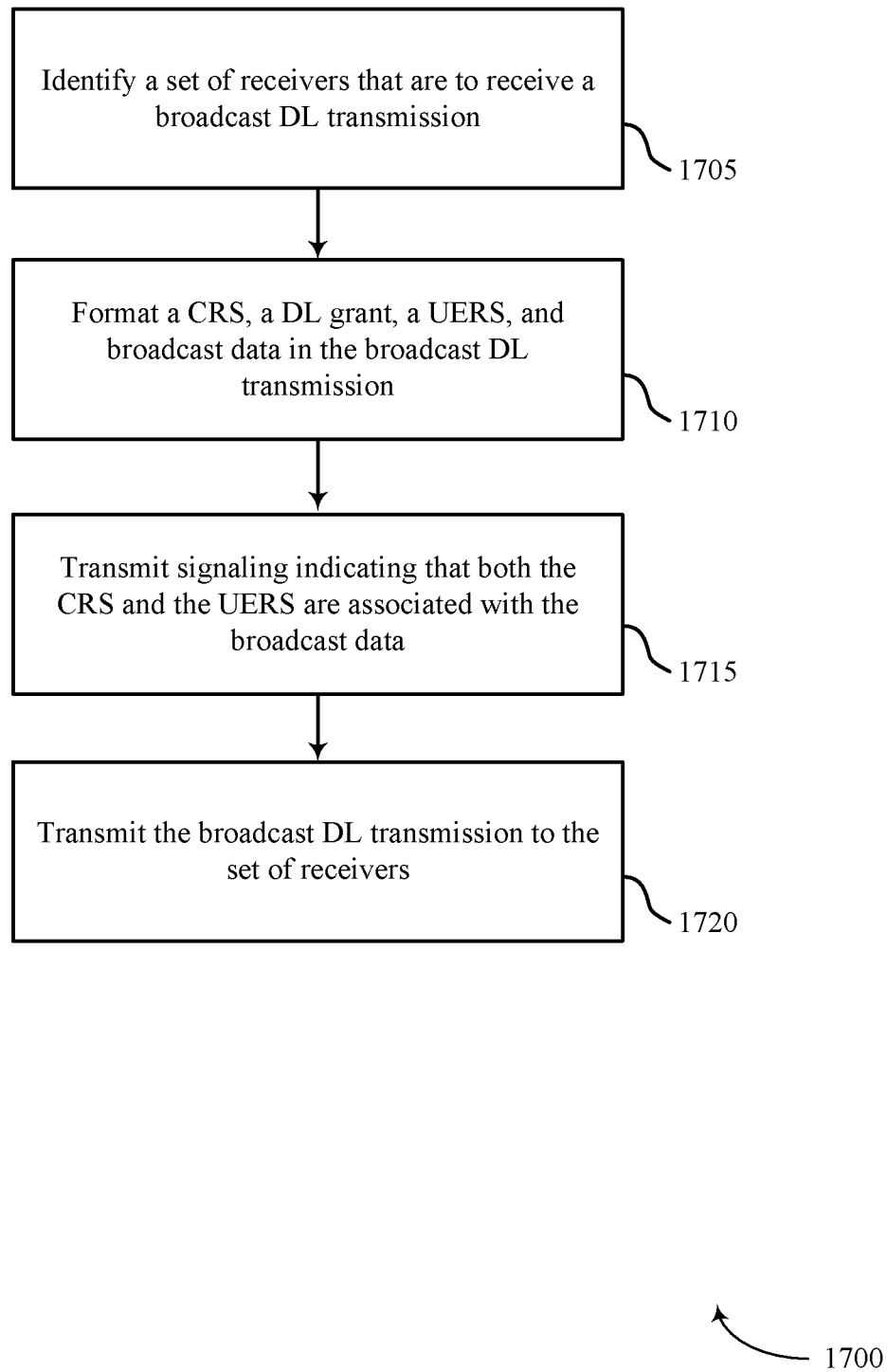

FIG. 17 shows a flowchart illustrating a method 1700 for reference signal transmission in wireless communications with multiple receivers in accordance with various aspects of the present disclosure. The operations of method 1700 may be implemented by a device such as a base station 105 or its components as described with reference to FIGS. 1 and 2. For example, the operations of method 1700 may be performed by the base station reference signal manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may identify a set of receivers that are to receive a broadcast DL transmission as described above with reference to FIGS. 2 through 4. In certain examples, the operations of block 1705 may be performed by the receiver identifying component as described with reference to FIGS. 10 and 11.

At block 1710, the base station 105 may format a CRS, a DL grant, a UERS, and broadcast data in the broadcast DL transmission as described above with reference to FIGS. 2 through 4. In certain examples, the operations of block 1710 may be performed by the broadcast formatting component as described with reference to FIGS. 10 and 11.

At block 1715, the base station 105 may transmit signaling indicating that both the CRS and the UERS are associated with the broadcast data as described above with reference to FIGS. 2 through 4. In certain examples, the operations of block 1715 may be performed by the RS association signaling component as described with reference to FIGS. 10 and 11.

At block 1720, the base station 105 may transmit the broadcast DL transmission to the set of receivers as described above with reference to FIGS. 2 through 4. In certain examples, the operations of block 1720 may be performed by the broadcast component as described with reference to FIGS. 10 and 11.

It should be noted that these methods describe possible implementation, and that the operations and the steps may be rearranged or otherwise modified such that other implementations are possible. In some examples, aspects from two or more of the methods 1300-1700, described with reference to FIGS. 12-17 may be combined. It should be noted that the methods 1300-1700 are just example implementations, and that the operations of the methods 1300-1700 may be rearranged or otherwise modified such that the other implementations are possible. For example, aspects of each of the methods may include steps or aspects of the other methods, or other steps or techniques described herein. Thus, aspects of the disclosure may provide for reference signal transmission in wireless communications with multiple receivers.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a geographic coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the geographic coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for reference signal transmission in wireless communications with multiple receivers. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. A method for wireless communication, comprising:
receiving, at a user equipment (UE), a downlink (DL) grant for a broadcast DL transmission from a base station, the DL grant being associated with a control reference signal (CRS);
identifying a transmission type of broadcast data in the broadcast DL transmission;
receiving the broadcast data, wherein the broadcast data is broadcast to a plurality of UEs;
identifying that the CRS and a UE specific reference signal (UERS) are associated with the broadcast data based at least in part on the identified transmission type of the broadcast data; and
demodulating the broadcast data based at least in part on the CRS and the UERS.

2. The method of claim 1, wherein identifying that the CRS and UERS are associated with the broadcast data comprises:
identifying that the UERS is associated with the broadcast data;
identifying that the CRS is further associated with the broadcast data; and
the demodulating the broadcast data is further based at least in part on an assumption that a same precoding is used for transmission of the CRS and UERS.

3. The method of claim 1, wherein demodulating the broadcast data comprises:
estimating a frequency offset based at least in part on a phase difference between the CRS and UERS; and
demodulating the broadcast data based at least in part on the estimated frequency offset.

4. The method of claim 3, wherein demodulating the broadcast data further comprises:
combining the CRS and UERS for use in a channel estimation; and
demodulating the broadcast data based at least in part on the channel estimation.

5. The method of claim 1, wherein a one or more antenna port of the UERS is mapped to a corresponding one or more antenna port of the CRS.

6. The method of claim 1, wherein identifying that the CRS and UERS are associated with the broadcast data comprises:
receiving signaling that indicates that both CRS and UERS are present and associated with the broadcast data.

7. The method of claim 6, wherein the signaling is semi-static signaling that applies to certain types of broadcast data that are transmitted to the plurality of UEs.

8. The method of claim 7, wherein a type of broadcast data is provided in the DL grant associated with the broadcast data.

9. The method of claim 6, wherein the signaling is dynamic signaling that applies to the broadcast data.

10. The method of claim 9, wherein the dynamic signaling is provided in the DL grant associated with the broadcast data.

11. A method of wireless communication comprising:
identifying a plurality of receivers that are to receive a broadcast downlink (DL) transmission;
formatting a DL grant for the broadcast DL transmission, wherein the DL grant is associated with a control reference signal (CRS);
formatting broadcast data, the CRS, and a user equipment (UE) specific reference signal (UERS) in the broadcast DL transmission, wherein a transmission type of the broadcast data is associated with both the CRS and the UERS;
transmitting the DL grant to the plurality of receivers; and
transmitting the broadcast DL transmission to the plurality of receivers.

12. The method of claim 11, wherein formatting the CRS, the DL grant, the UERS, and broadcast data for transmission in the broadcast DL transmission comprises:
applying a same precoding to the CRS, and UERS.

13. The method of claim 11, wherein transmitting the broadcast DL transmission comprises:
transmitting the CRS using a first set of antenna ports; and
transmitting the UERS using a second set of antenna ports that are one-to-one mapped to the first set of antenna ports.

14. The method of claim 11, further comprising:
transmitting signaling indicating that both the CRS and the UERS are associated with the broadcast data.

15. The method of claim 14, wherein the signaling is semi-static signaling that applies to a plurality of broadcast data.

16. The method of claim 14, wherein the signaling is dynamic signaling that applies to one set of broadcast data.

17. An apparatus for wireless communication, comprising:
a processor;
memory in electronic communication with the processor; and
instructions stored in the memory and operable, when executed by the processor, to cause the apparatus to:
receive, at a user equipment (UE), a downlink (DL) grant for a broadcast DL transmission from a base station, the DL grant being associated with a control reference signal (CRS);
identify a transmission type of broadcast data in the broadcast DL transmission;
receive the broadcast data, wherein the broadcast data is broadcast to a plurality of UEs;
identify that the CRS and a UE specific reference signal (UERS) are associated with the broadcast data based at least in part on the identified transmission type of the broadcast data; and
demodulate the broadcast data based at least in part on the CRS and the UERS.

18. The apparatus of claim 17, wherein the instructions are further operable to cause the processor to cause the apparatus to:
identify that the UERS is associated with the broadcast data;
identify that the CRS is further associated with the broadcast data; and
demodulate the broadcast data based at least in part on an assumption that a same precoding is used for transmission of the CRS and UERS.

19. The apparatus of claim 17, wherein the instructions are further operable to cause the processor to cause the apparatus to:
estimate a frequency offset based at least in part on a phase difference between the CRS and UERS; and
demodulate the broadcast data based at least in part on the estimated frequency offset.

20. The apparatus of claim 19, wherein the instructions are further operable to cause the processor to cause the apparatus to:
    combine the CRS and UERS for use in a channel estimation; and
    demodulate the broadcast data based at least in part on the channel estimation.

21. The apparatus of claim 17, wherein the instructions are further operable to cause the processor to cause the apparatus to:
    receive signaling that indicates that both CRS and UERS are present and associated with the broadcast data.

22. The apparatus of claim 21, wherein the signaling is semi-static signaling that applies to certain types of broadcast data that are transmitted to the plurality of UEs, and a type of broadcast data is provided in the DL grant associated with the broadcast data.

23. The apparatus of claim 21, wherein the signaling is dynamic signaling that applies to the broadcast DL transmission.

24. An apparatus for wireless communication, comprising:
    a processor;
    memory in electronic communication with the processor; and
    instructions stored in the memory and operable, when executed by the processor, to cause the apparatus to:
        identify a plurality of receivers that are to receive a broadcast downlink (DL) transmission;
        format a DL grant for the broadcast DL transmission, wherein the DL grant is associated with a control reference signal (CRS);
        format broadcast data, the CRS, and a user equipment (UE) specific reference signal (UERS) in the broadcast DL transmission, wherein a transmission type of the broadcast data is associated with both the CRS and the UERS;
        transmit the DL grant to the plurality of receivers; and
        transmit the broadcast DL transmission to the plurality of receivers.

25. The apparatus of claim 24, wherein the instructions are further operable to cause the processor to cause the apparatus to:
    apply a same precoding to the CRS and UERS.

26. The apparatus of claim 24, wherein the instructions are further operable to cause the processor to cause the apparatus to:
    transmit the CRS using a first set of antenna ports; and
    transmit the UERS using a second set of antenna ports that are one-to-one mapped to the first set of antenna ports.

27. The apparatus of claim 24, wherein the instructions are further operable to cause the processor to cause the apparatus to:
    transmit signaling indicating that both the CRS and the UERS are associated with the broadcast data.

28. The apparatus of claim 27, wherein the signaling is semi-static signaling that applies to a plurality of broadcast data.

* * * * *